(12) United States Patent
Yang

(10) Patent No.: US 11,907,240 B2
(45) Date of Patent: *Feb. 20, 2024

(54) METHOD AND SYSTEM FOR PRESENTING A SEARCH RESULT IN A SEARCH RESULT CARD

(71) Applicant: YAHOO ASSETS LLC

(72) Inventor: Wen Yang, Beijing (CN)

(73) Assignee: YAHOO ASSETS LLC, Dulles, VA (US)

( * ) Notice: Subject to any disclaimer, the term of this patent is extended or adjusted under 35 U.S.C. 154(b) by 71 days.

This patent is subject to a terminal disclaimer.

(21) Appl. No.: 17/307,448

(22) Filed: May 4, 2021

(65) Prior Publication Data

US 2021/0256020 A1 Aug. 19, 2021

Related U.S. Application Data

(63) Continuation of application No. 16/018,450, filed on Jun. 26, 2018, now Pat. No. 11,003,678, which is a
(Continued)

(51) Int. Cl.
*G06F 16/248* (2019.01)
*G06F 16/438* (2019.01)
(Continued)

(52) U.S. Cl.
CPC ........ *G06F 16/248* (2019.01); *G06F 3/04883* (2013.01); *G06F 16/2228* (2019.01);
(Continued)

(58) Field of Classification Search
CPC .... G06F 16/248; G06F 16/438; G06F 16/228; G06F 16/9535; G06F 16/951
(Continued)

(56) References Cited

U.S. PATENT DOCUMENTS 8,156,135 B2 4/2012 Chi et al.
8,589,386 B2 11/2013 Leslie et al.
(Continued)

FOREIGN PATENT DOCUMENTS

CN 102375823 A 3/2012
CN 103164449 A 6/2013
(Continued)

OTHER PUBLICATIONS

International Preliminary Report on Patentability dated Nov. 2, 2017 in International Application PCT/CN2015/077268.
International Search Report and Written Opinion dated Jan. 27, 2016 in International Application PCT/CN2015/077268.

*Primary Examiner* — Shahid A Alam
(74) *Attorney, Agent, or Firm* — Venable LLP

(57) ABSTRACT

A method, implemented on at least one computing device each of which has at least one processor, storage, and a communication platform connected to a network for presenting a search result in a search result card, the method includes receiving from a user, an input associated with a search query; fetching one or more search results in accordance with the search query; generating a search result card for each of the one or more search results; and presenting to the user, one or more search result cards as a response to the search query, the one or more search result cards corresponding to the one or more search results, respectively.

20 Claims, 22 Drawing Sheets

Related U.S. Application Data continuation of application No. 14/439,288, filed as application No. PCT/CN2015/077268 on Apr. 23, 2015, now Pat. No. 10,031,954.

(51) Int. Cl.

| | | |
|---|---|---|
| *G06F 16/951* | (2019.01) | |
| *G06F 16/22* | (2019.01) | |
| *G06F 16/9535* | (2019.01) | |
| *G06F 16/9538* | (2019.01) | |
| *G06F 3/04883* | (2022.01) | |
| *G06F 3/0482* | (2013.01) | |

(52) U.S. Cl.
CPC .......... *G06F 16/438* (2019.01); *G06F 16/951* (2019.01); *G06F 16/9535* (2019.01); *G06F 16/9538* (2019.01); *G06F 3/0482* (2013.01)

(58) Field of Classification Search
USPC ........................................................ 707/722
See application file for complete search history.

(56) References Cited

U.S. PATENT DOCUMENTS

| | | | |
|---|---|---|---|
| 9,224,007 B2* | 12/2015 | Fox | G06F 16/9535 |
| 9,336,309 B2 | 5/2016 | Wurzer | |
| 9,519,726 B2 | 12/2016 | Kumar et al. | |
| 2008/0222132 A1 | 9/2008 | Pan et al. | |
| 2009/0300000 A1 | 12/2009 | Mackintosh et al. | |
| 2011/0082484 A1 | 4/2011 | Saravia et al. | |
| 2011/0082848 A1* | 4/2011 | Goldentouch | G06F 16/9535 707/706 |
| 2011/0231223 A1 | 9/2011 | Winters | |
| 2013/0006914 A1 | 1/2013 | Ray et al. | |
| 2015/0178284 A1 | 6/2015 | Garg et al. | |
| 2015/0261834 A1 | 9/2015 | Shi | |
| 2015/0317327 A1* | 11/2015 | He | G06F 16/1744 707/693 |

FOREIGN PATENT DOCUMENTS

| | | |
|---|---|---|
| CN | 103886044 A | 6/2014 |
| CN | 104111990 A | 10/2014 |

* cited by examiner

METHOD AND SYSTEM FOR PRESENTING A SEARCH RESULT IN A SEARCH RESULT CARD

CROSS REFERENCE TO RELATED APPLICATIONS

This application is a continuation of U.S. patent application Ser. No. 16/018,450 filed Jun. 26, 2018, which is a continuation of U.S. patent application Ser. No. 14/439,288, now U.S. Pat. No. 10,031,954, filed Apr. 23, 2015, which is a national stage application, filed under 35 U.S.C. § 371, of International Application No. PCT/CN2015/077268, filed on Apr. 23, 2015, entitled "METHOD AND SYSTEM FOR PRESENTING A SEARCH RESULT IN A SEARCH RESULT CARD", all of which are hereby incorporated by reference in their entireties.

BACKGROUND

Technical Field

The present teaching relates to methods, systems, and programming for online search. Particularly, the present teaching relates to methods, systems, and programming for presenting a search result in a search result card.

Discussion of Technical Background

Online search is a process of interactively searching for and retrieving requested information via a search application running on a local user device, such as a computer or a mobile device, from online databases. Online search is conducted through search engines, which are programs running at a remote server and searching webpages or documents for specified keywords and return a search results page having a list of links to the webpages or documents where the keywords are found.

According to an existing searching technology, the search result that matches one or more keywords is presented to the user in one or more links to websites or documents with snippets from the websites. Yet in another existing searching technology, the search result page may include graphic information that directs to one or more links. FIG. 1(a) illustrates an exemplary search result 106 displayed on a smart phone in the prior art. The search result of Sunnyvale Seafood Company 106 is presented with a first link to the website, a short-sentence snippet, a second link to the contact us site, and a more detailed snippet. The information in the snippet of the search result 106 is very limited, and the textual description of the search result has to be in small fonts to fit into the display area. Therefore, it is difficult for the user to view the search result and determine further actions associated with the search result. FIG. 1(b) illustrates another exemplary search result 104 displayed on a smart phone in the prior art. Before presenting the search results that match the keyword "Sunnyvale seafood company," an advertisement for Seafood & Steak House is presented with a map and image information that nearly occupies the entire display area of the smart phone. In addition, information contained in the advertisement includes pieces of information from various search result sources for the purpose of advertising, rather than information that is most relevant to the search query. In such a circumstance, search results presented to the user may not be helpful as the first presented advertisement is not of the user's interest.

Therefore there is a need to provide an improved solution for presenting search results to users to solve the above-mentioned problems.

SUMMARY

The present teaching relates to methods, systems, and programming for online search. Particularly, the present teaching relates to methods, systems, and programming for presenting a search result in a search result card.

According to some embodiments, a method implemented on at least one computing device each of which has at least one processor, storage, and a communication platform connected to a network for presenting a search result in a search result card, the method comprises receiving from a user, an input associated with a search query; fetching one or more search results in accordance with the search query; generating a search result card for each of the one or more search results; and presenting to the user, one or more search result cards as a response to the search query, the one or more search result cards corresponding to the one or more search results, respectively.

In some embodiments, the method further comprises constructing an index portion of the search result card, which includes at least obtaining a title from the search result; obtaining at least one image from the search result; obtaining snippet information from the search result; and constructing a content portion of the search result card, which includes at least extracting a plurality of information entities from the search result, wherein the plurality of information entities include types of textual entity, static image entity, animated image entity, audio entity, and video entity.

In some embodiments, the index portion and the content portion are presented in a display area of the search result card configured to be touchable.

In some embodiments, a touch operation of the display area is configured to open a landing page associated with the search result.

In some embodiments, a touch operation of the display area is configured to perform operations including playing an audio within the display area when an audio entity in the content portion of the search result card is clicked; and playing a video within the display area when a video entity in the content portion of the search result card is clicked.

In some embodiments, the plurality of information entities in the content portion of the search result card are sorted based on user behavior statistics.

In some embodiments, the plurality of information entities in the content portion of the search result card are presented in a sliding mode, which is configured to allow the user to slide and view the plurality of information entities within the display area of the search result card in one direction.

In some embodiments, the one or more search result cards are presented in a tabbed interface, which is configured to allow displaying a first search result card to fit a screen area of the computing device, and navigation to a second search result card by sliding the screen area of the computing device.

According to some embodiments, a system having at least one processor, storage, and a communication platform for presenting a search result in a search result card, the system comprises a user interfacing module configured to receive an input associated with a search query from a user; a search results fetching module configured to fetch one or more search results based on the search query; a search result cards generating module configured to generate a search result card for each of the one or more search results with respect to the user; and a search result cards presenting module configured to present to the user one or more search result cards in response to the search query, wherein the one or more search result cards correspond to the one or more search results, respectively.

In some embodiments, the system further comprises an index portion generating module configured to construct an index portion of the search result card, which includes at least the steps of obtaining a title from the search result; obtaining at least one image from the search result; obtaining snippet information from the search result; and a content portion generating module configured to construct a content portion of the search result card, which includes at least the step of: extracting a plurality of information entities from the search result, wherein the plurality of information entities include types of textual entity, static image entity, animated image entity, audio entity, and video entity.

In some embodiments, the index portion and the content portion are presented in a display area of the search result card configured to be touchable.

According to some embodiments, a non-transitory machine-readable medium having information recorded thereon for presenting a search result in a search result card, wherein the information, when read by the machine, causes the machine to perform the following: receiving from a user, an input associated with a search query; fetching one or more search results in accordance to the search query; generating a search result card for each of the one or more search results with respect to the user; and presenting to the user, one or more search result cards in response to the search query, the one or more search result cards corresponding to the one or more search results, respectively.

The present teaching discloses a method and system for presenting a search result in a search result card, which provides a touch friendly interface on a mobile phone screen and provides rich media contents of the search result rather than plain textual information. In one embodiment according to the present teaching, the search result cards are pre-generated during a scheduled webpage crawling, and stored in advance in a search result cards database. Therefore, the present teaching can respond quickly to the user query by directly fetching the search result card from the database. As the pre-generated search result card may consider statistic data associated with the search result, i.e, the webpage or document, the pre-generated search result card can present the search result to match the browsing behavior of the majority of users. In yet another embodiment of the present teaching, the search result card is generated in real-time upon receiving a user query. The statistic data associated with the particular user is collected and incorporated into the construction process of the search result card. The real-time generated search result card has great advantage of providing a personalized search result that best matches the user's interest and browsing behavior, in addition to the advantages set forth above.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
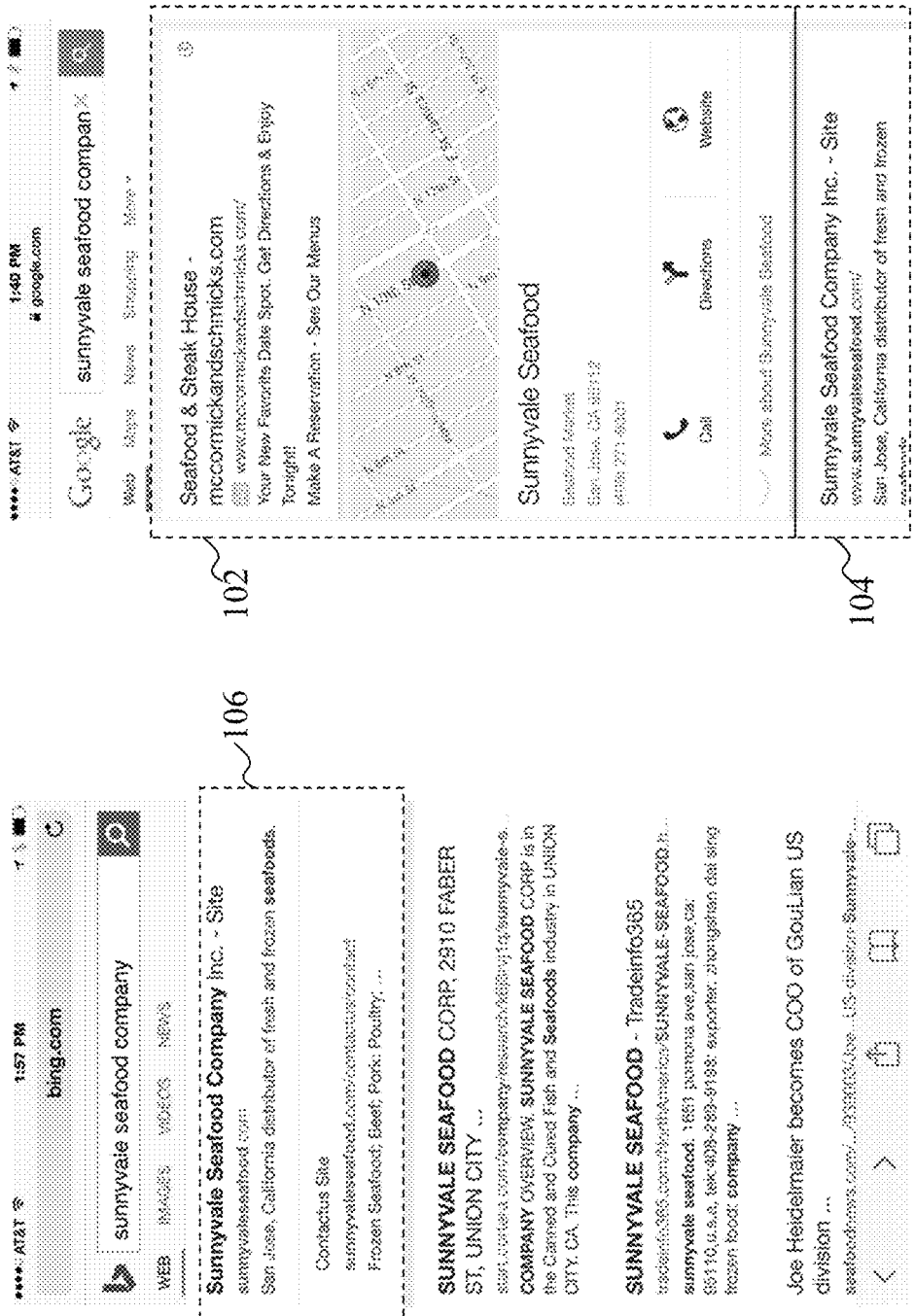
FIG. 1 illustrates exemplary search results pages in the prior art.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

Throughout the specification and claims, terms may have nuanced meanings suggested or implied in context beyond an explicitly stated meaning. Likewise, the phrase "in one embodiment/example" as used herein does not necessarily refer to the same embodiment and the phrase "in another embodiment/example" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present teaching describes methods, systems, and programming aspects of presenting a content summary of search results to users. The methods and systems in the present teaching improve users' search experience by providing smaller complete stories, i.e., summaries, as opposed to multiple story abstracts, which show part of, or redundant snippets of the same story. The summary of the search result(s) provides a user the information that she/he is interested in such that the user does not have to perform any more clicks to reach to the information she/he is interested in. The methods and systems in the present teaching improve user experience by saving the user's time, as the complete story relating to the query is surfaced on the search results page itself. The user can still click on the webpage or other results on the page if the user is interesting, or needs in-depth information on the topic. Accordingly, the methods and systems in the present teaching solve the common problem called "tldr" (too long dint read) in the context of search results.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

Figure 2:
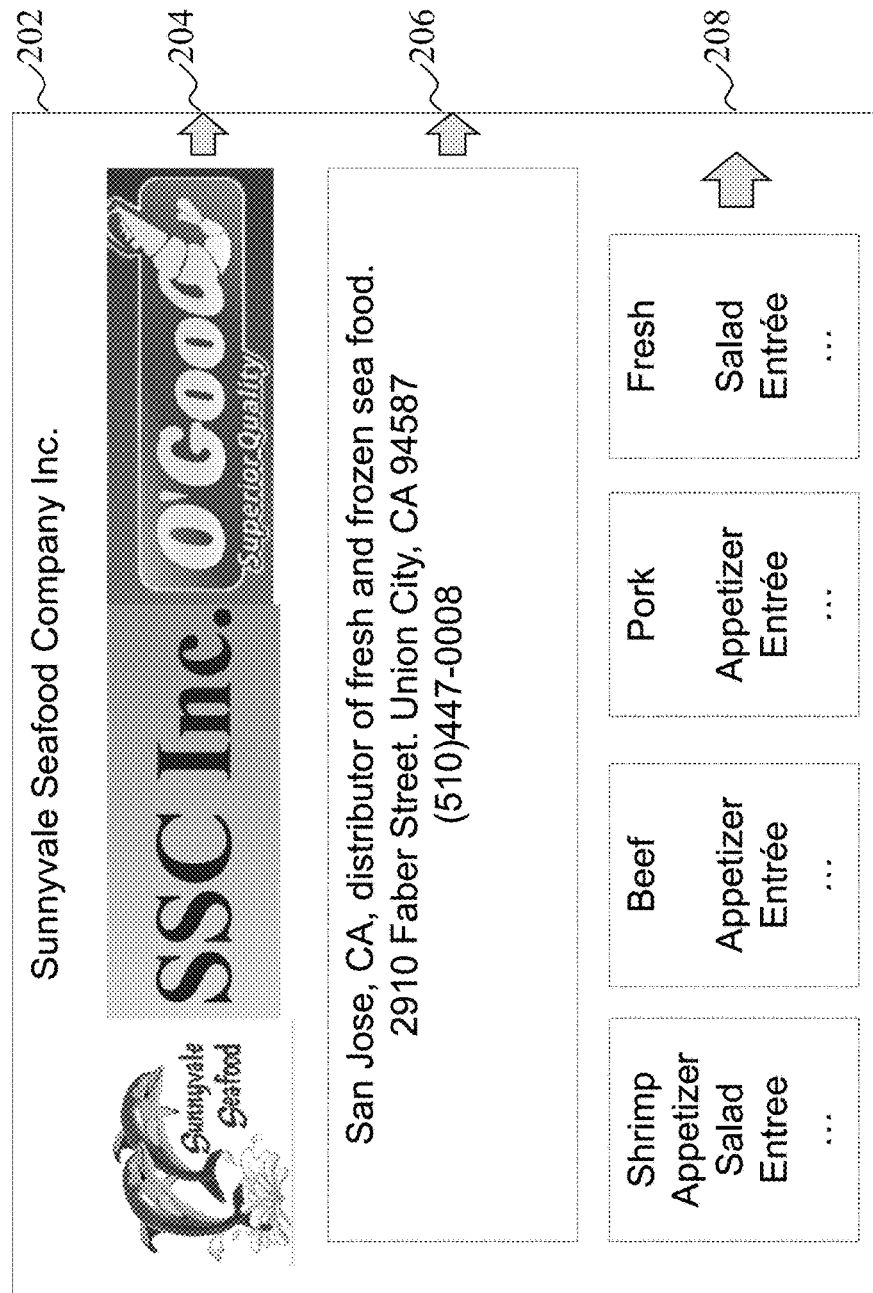
FIG. 2 illustrates an exemplary search result card corresponding to a search result, according to an embodiment of the present teaching.

FIG. 2 illustrates an exemplary search result card corresponding to a search result, according to an embodiment of the present teaching. According to the illustrated embodiment, the search result for "Sunnyvale Seafood Company" is presented in a rectangular search result card, which includes a title of the search result 202, a logo/image of the search result 204, a snippet related to information of the search result 206, and a plurality of information entities extracted from the search result 208. In some embodiment, the logo/image 204 may include third-party images associated with the search result, for example, an O'Good or a Michelin rating for the Sunnyvale Seafood Company. The snippet 206 may provide a full text of snippet extracted from the webpage to the user. The plurality of information entities 208 may be extracted directly from the webpage and presented to the user in a predetermined format. In some embodiment, the plurality of information entities 208 may be reorganized information based on the directly extracted entities from the webpage and presented with respect to the user. For example, if it is determined based on the user carry-out order history that the user favors shrimps, the entity of organized shrimp appetizer/salad/entree may be presented at the first place to the user.

In some embodiments, the information entity may be an audio or a video extracted from the webpage. When the user clicks the "play" button on the audio or video, it may play the audio or video directly within the information entity box without navigating to a separate browser. Therefore, it provides the user a quick and resourceful review of some popular audios or videos of the webpage with no need to navigate to a separate window and reload the audios or videos.

In some embodiment, the search result card may be pre-configured with a dimension and a layout template to show a certain amount of images and textual information. In yet another embodiment, the logo/image 204, the snippet related to information 206, and the plurality of information entities may be presented in a sliding mode, allowing the user to slide on the display area and view more pieces of information associated with the search result. For example, the search result card in FIG. 2 initially shows three images in the logo/image, one piece of snippet information, and four information entities. By sliding the logo/image section to the left, the user may view more images related to the search result; and similarly, the user may view more snippet information or information entities.

Figure 3:
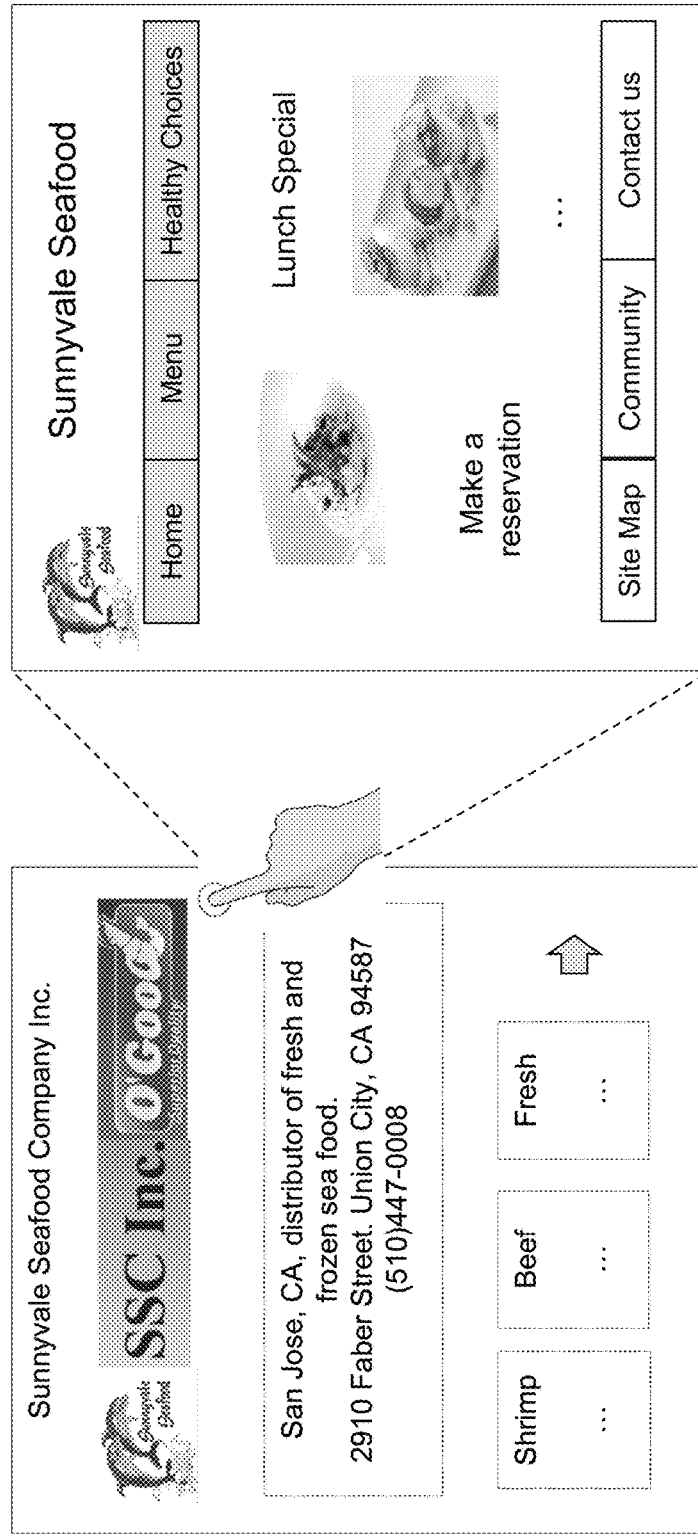
FIG. 3 illustrates an exemplary search result card and a landing page associated with a touch operation on the search result card, according to an embodiment of the present teaching.

FIG. 3 illustrates an exemplary search result card and a landing page associated with a touch operation on the search result card, according to an embodiment of the present teaching. In some embodiment, the entire display area of the search result card may be configured to be touchable, and a touch operation on the display area may open a landing page associated with the search result. As shown in FIG. 3, a user touch on the search result card directs the user to the homepage of the Sunnyvale Seafood Company. It is understood that the landing page opened by the user's touch operation on the search result care is not limited to the homepage of the search result, and can be any webpages associated with the search result. In some embodiment, the landing page may display directed sales copy that is a logical extension of the search result, for example, a third-party reservation webpage that serves multiple restaurants including the Sunnyvale Seafood Company, or a third-party interest quote webpage associated with a realtor company.

Figure 4:
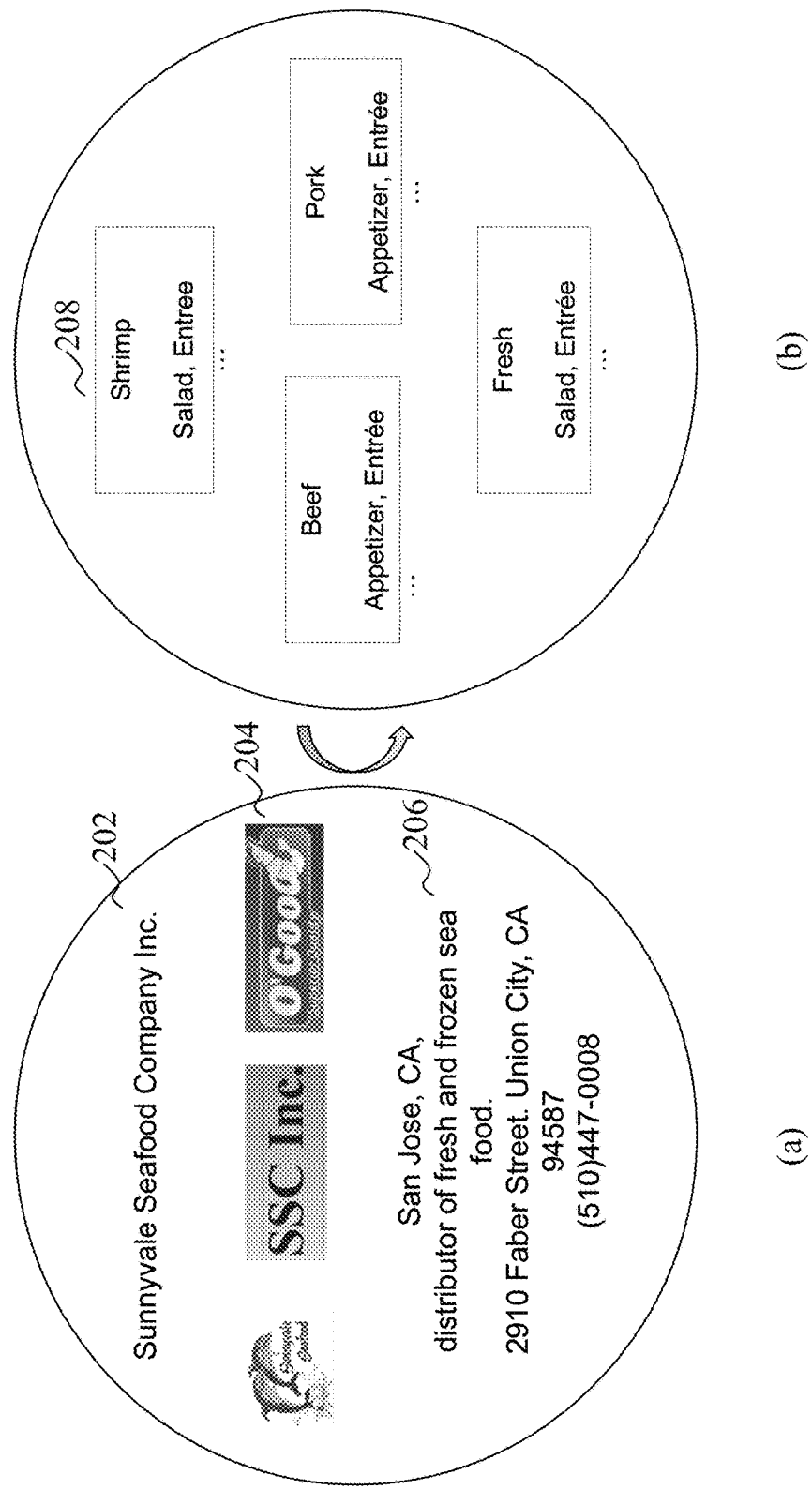
FIG. 4 illustrates an exemplary search result card corresponding to a search result, according to another embodiment of the present teaching.

FIG. 4 illustrates another exemplary search result card corresponding to a search result, according to an embodiment of the present teaching. In addition to the rectangular display, the search result card may be displayed in various shapes in accordance with the web browsing application and/or the user device. In the embodiment shown in FIG. 4, the search result card is presented in a 3-D ball shape with the title 202, logo/image 204, and snippet information 206 displayed on one side sphere of the 3-D ball and the plurality of information entities 208 on another side sphere of the 3-D ball. When the user touches the search result card and slide to one direction, the 3-D ball rotates and presents more information in the search result card to the user. The pieces of information in a search result card in FIGS. 2-4 are organized in rectangular or square boxes; however, they are not limited to the mentioned shapes. The pieces of information in a search result card may be organized into all types of shapes, for example, jigsaw puzzle pieces that compose a full picture of the search result.

Figure 5:
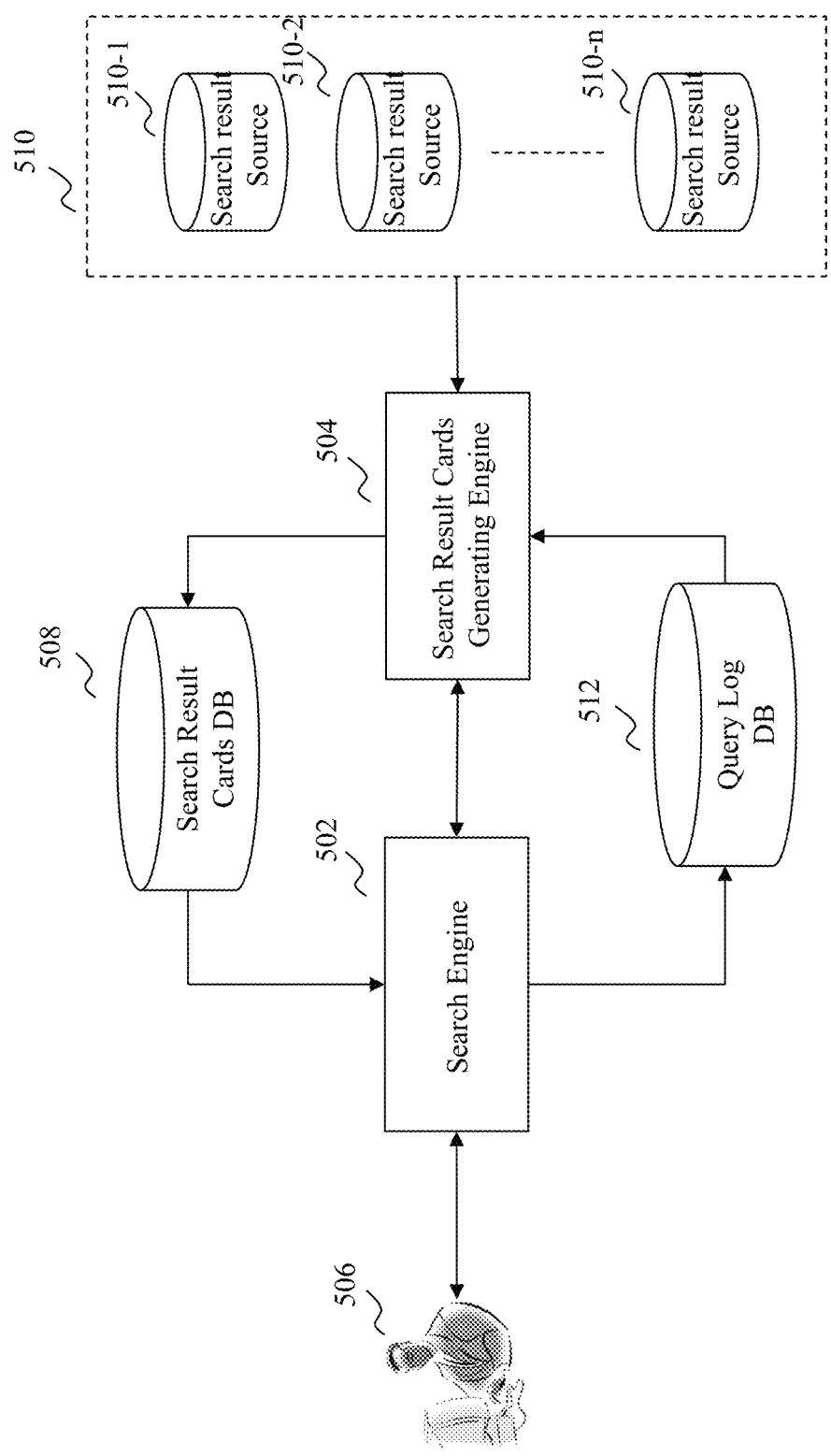
FIG. 5 is an exemplary system diagram of a system for presenting a search result in a search result card, according to an embodiment of the present teaching.

FIG. 5 is an exemplary system diagram of a system for presenting a search result in a search result card, according to an embodiment of the present teaching. The system 500 may include a search engine 502 and a search result cards generating engine 504. The search engine 502 may receive search queries from a user 506, either by direct typing keywords in the search box or by selecting one of the query suggestions or trending queries. The search engine 502 may further fetch search results in accordance with the search query, and determine whether one or more search result cards are available in a search result cards database 508 for fetching. In some embodiment, a query log database 512 may be used by the search engine 502 and/or the search card generating engine 504 for determining whether search result cards need to be generated in advance by crawling the webpages.

In some embodiment, the search result cards generating engine 504 may generate search result cards for search results offline and store them into the search result cards database 508. The search engine 502 may further directly retrieve the corresponding search result cards from the search result cards database 508 in real-time upon receiving a search query from the user.

In some embodiment, when the search result cards are not available upon receiving the search queries from the user, the search result cards generating engine 504 may generate the search result cards in real-time based on the search queries. In some embodiment, the search result generating cards may incorporate the user statistics into generating the search result cards such that the search result cards presented to the user fit the user's browsing behavior or interest. The search result cards engine 504 may fetch the content of the search result(s) from search result sources 510-1, 510-2, . . . , 510-*n* and construct the search result cards in real-time.

It is understood that the search engine 502 in this embodiment is not limited to a traditional web search engine that crawls websites on the Internet, builds webpage index, and retrieves webpages based on received keywords. The search engine 502 may be any online system that provides output content/results in response to an input query. The search engine 502 may be an online knowledge-based information retrieving system that provides answers to questions from users. For example, a user may ask a question of "should I leave college to start a business" through the search engine 502, and several answers may be returned on a result page provided by the search engine 502.

Figure 6A:
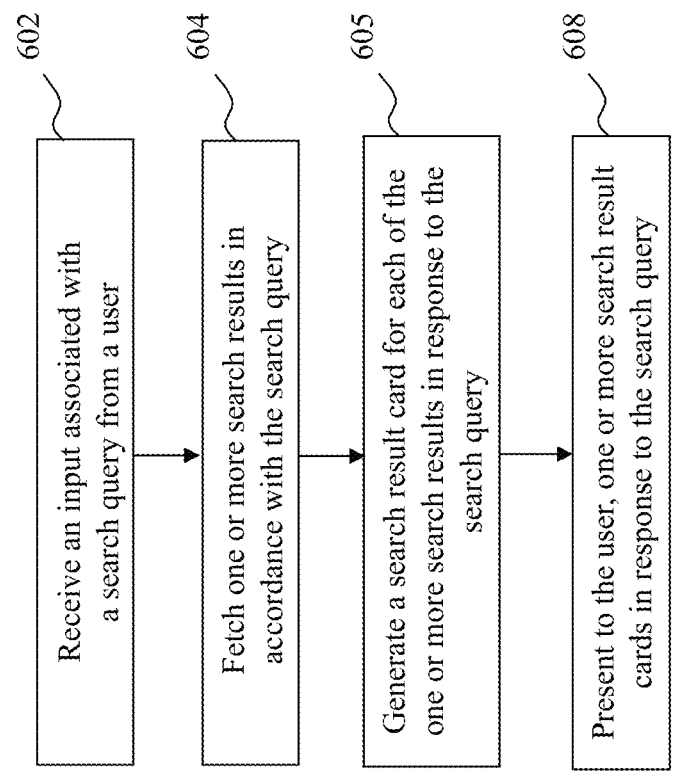
FIG. 6A is a flowchart of an exemplary process for presenting a search result in a search result card, according to an embodiment of the present teaching.

FIG. 6A is a flowchart of an exemplary process for presenting a search result in a search result card, according to an embodiment of the present teaching. At step 602, an input associated with a search query is received from a user. The input may be selection of the search query from multiple search queries presented to the user, e.g., trending queries or search suggestions, as well as any keywords directly typed in by the user. At step 604, one or more search results are fetched based on the search query. The search result(s) may be of different types fetched from different verticals, such as news articles, sports, images, videos, local information, PDF, WORD or PPT documents, etc. The number of search result(s) fetched for each search query may be limited, e.g., the top three or 10 most relevant search results. At step 605, a search result card for each of the one or more search results is generated in response to the search query. According to the embodiment shown in FIG. 6A, the search result card is pre-generated and stored in the search result cards database, and is retrieved directly in response to the search query. At step 608, one or more search result cards are presented to the user.

Figure 6B:
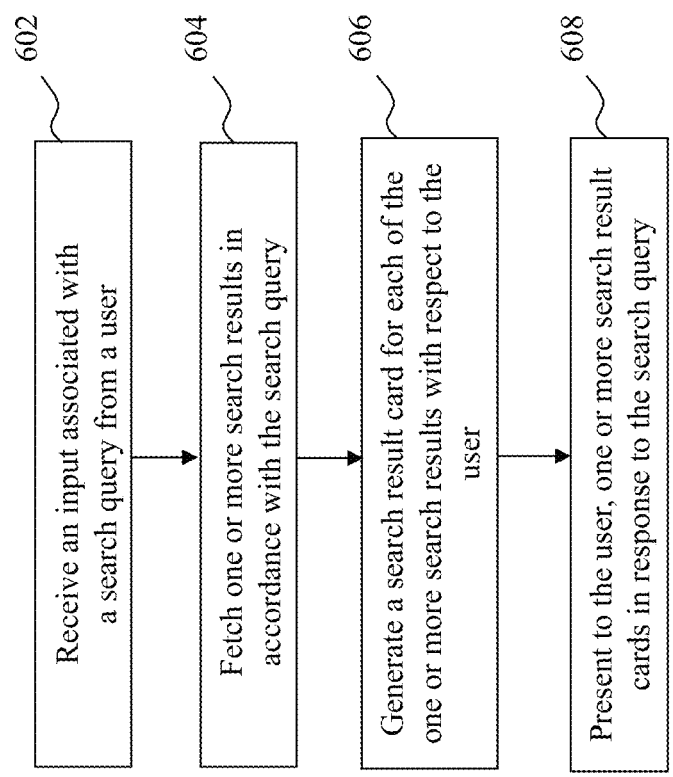
FIG. 6B is a flowchart of an exemplary process for presenting a search result in a search result card, according to another embodiment of the present teaching.

FIG. 6B is a flowchart of an exemplary process for presenting a content summary of search results, according to another embodiment of the present teaching. Steps 602, 604 and 608 are the same as described in FIG. 6A. The difference is at step 606, where a search result card for each of the one or more search results is generated with respect to the user in real-time. Information associated with the user, such as the browsing behavior of the user, the browsing history of the user, may be provided to generate a personalized search result card.

Figure 7A:
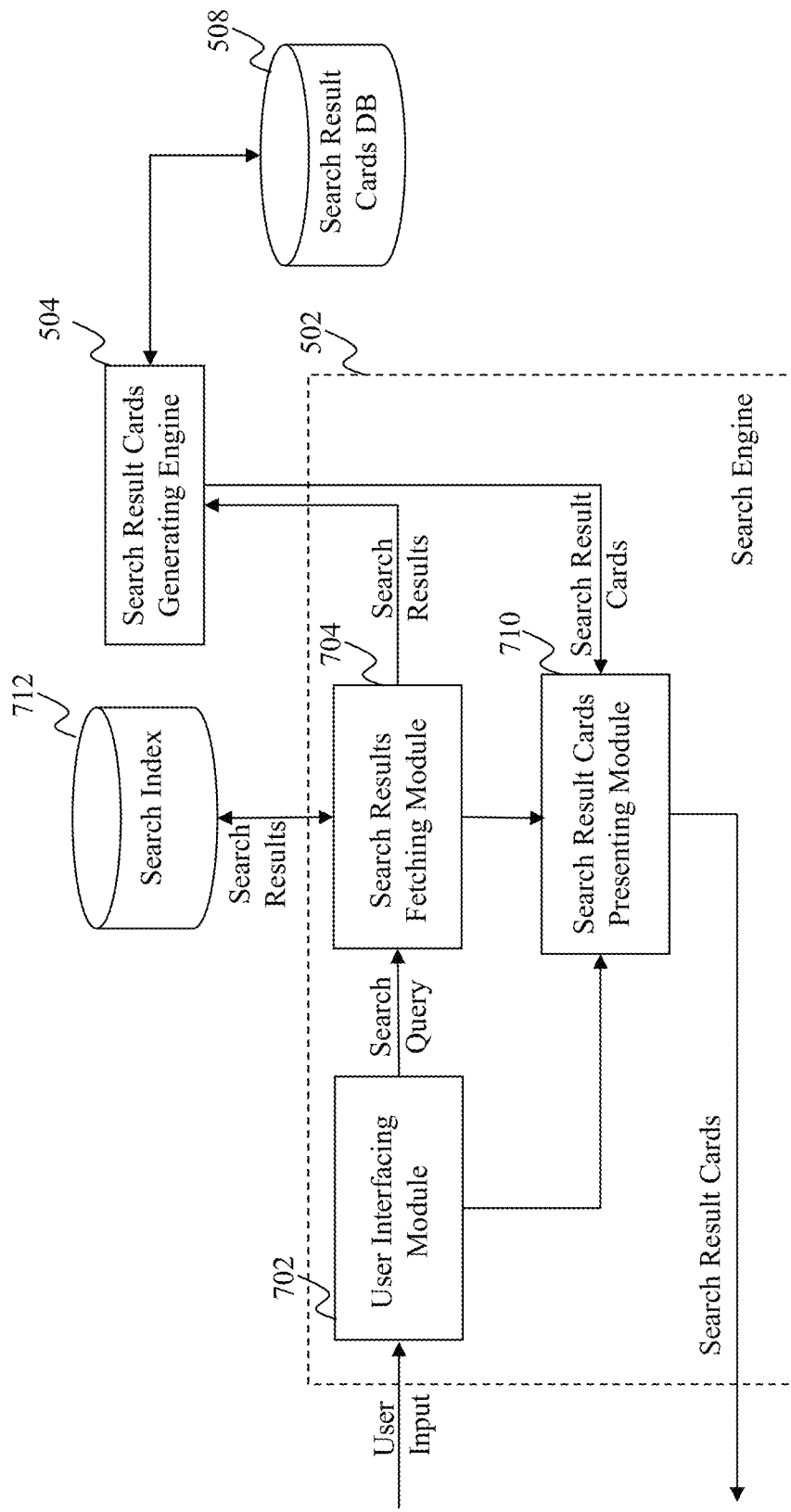
FIG. 7A is an exemplary system diagram of a search engine in the system of FIG. 5, according to an embodiment of the present teaching.

FIG. 7A is an exemplary system diagram of a search engine in the system of FIG. 5, according to an embodiment shown in FIG. 6A. The search engine 502 in this embodiment includes a user interfacing module 702, a search results fetching module 704, and a search result cards presenting module 710. The user interfacing module 702 is configured to receive user input associated with a search query and provide the search query to the search results fetching module 704. The search query may be keywords inputted through a search box or received as selection of a suggested trending query or search suggestion. The search results fetching module 704 is configured to fetch corresponding search results from a search index 712. The types and number of search results fetched for a search query may be controlled by the user and/or the search engine 502. The search results are provided to the search result cards generating engine 504, which is configured to fetch one or more pre-generated search result cards from the search result cards database 508. The search result cards generating engine 504 further returns the search result cards to the search result cards presenting module 710 for presenting to the user. In addition to the advantage of providing the user with a touch friendly interface and a rich media search result, generating the search result cards offline and storing the search result cards in the database in advance can further provide the user with quick response to a user query.

Figure 7B:
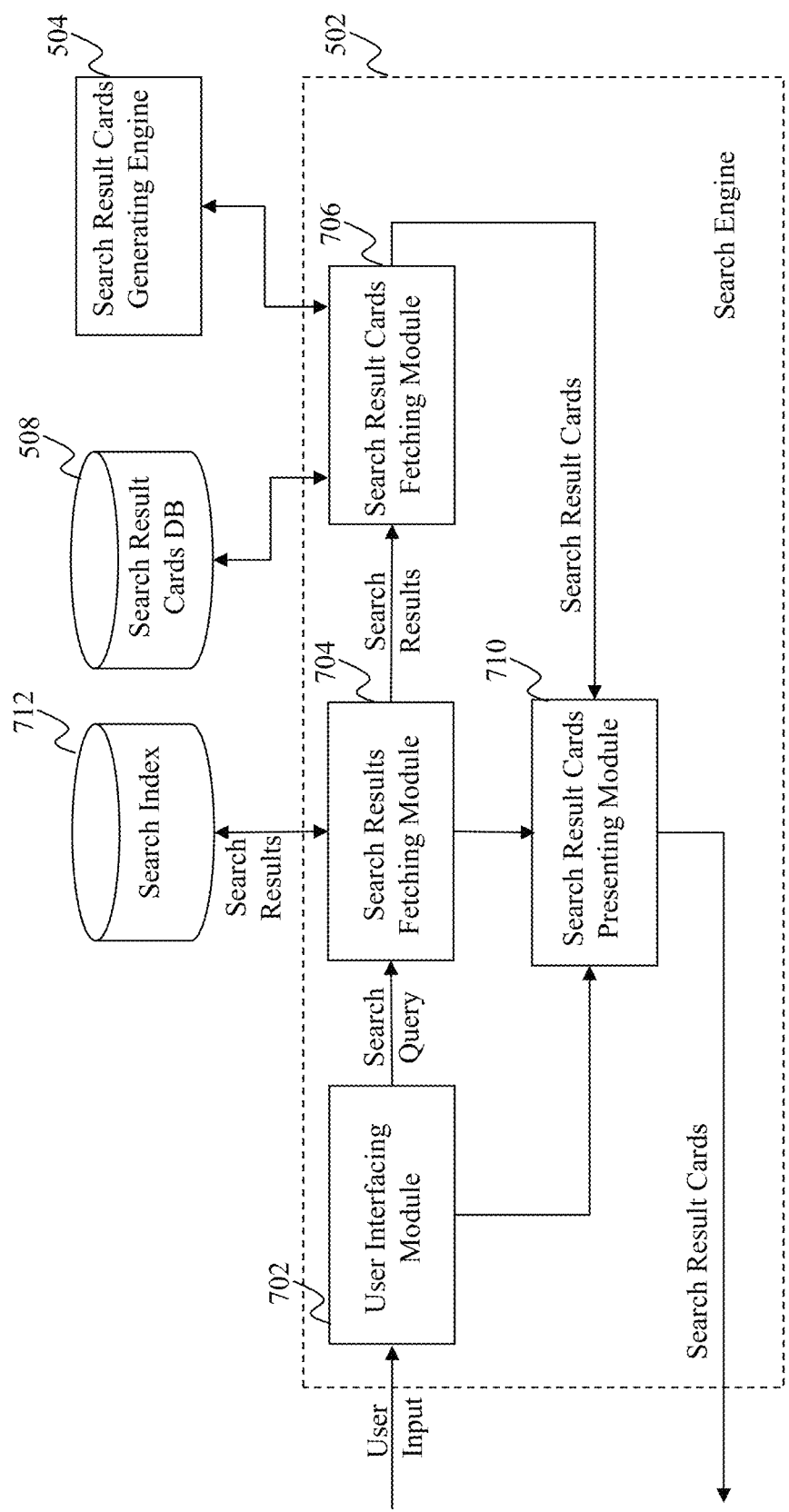
FIG. 7B is an exemplary system diagram of a search engine in the system of FIG. 5, according to another embodiment of the present teaching.

FIG. 7B is an exemplary system diagram of a search engine in the system of FIG. 5, according to another embodiment shown in FIG. 6B. The search engine 502 in this embodiment includes a user interfacing module 702, a search results fetching module 704, a search result cards presenting module 710, and a search result cards fetching module 706. According to this embodiment, the search result cards fetching module 706 searches the search result cards database 508 upon receiving a search result, and determines whether a corresponding search result card has been pre-generated. If it is determined that the corresponding search result card has been pre-generated, the search result cards fetching module 706 directly fetch the search result card from the search result cards database 508. If it is determined that the corresponding search result card has not yet been pre-generated, the search result cards fetching module 706 provides the search result to the search result cards generating engine 504 to construct a new search result card in real-time for the corresponding search result. As the search result card is generated in real-time upon receiving the user query, historical data associated with the particular user's browsing behavior may be incorporated into the search result card construction process. Therefore, search result cards generated in real-time has great advantage of personalizing the search result in response to the user's search query that best matches the user's interest and behavior pattern, in addition to providing a touch friendly interface and a rich media search result.

Figure 8A:
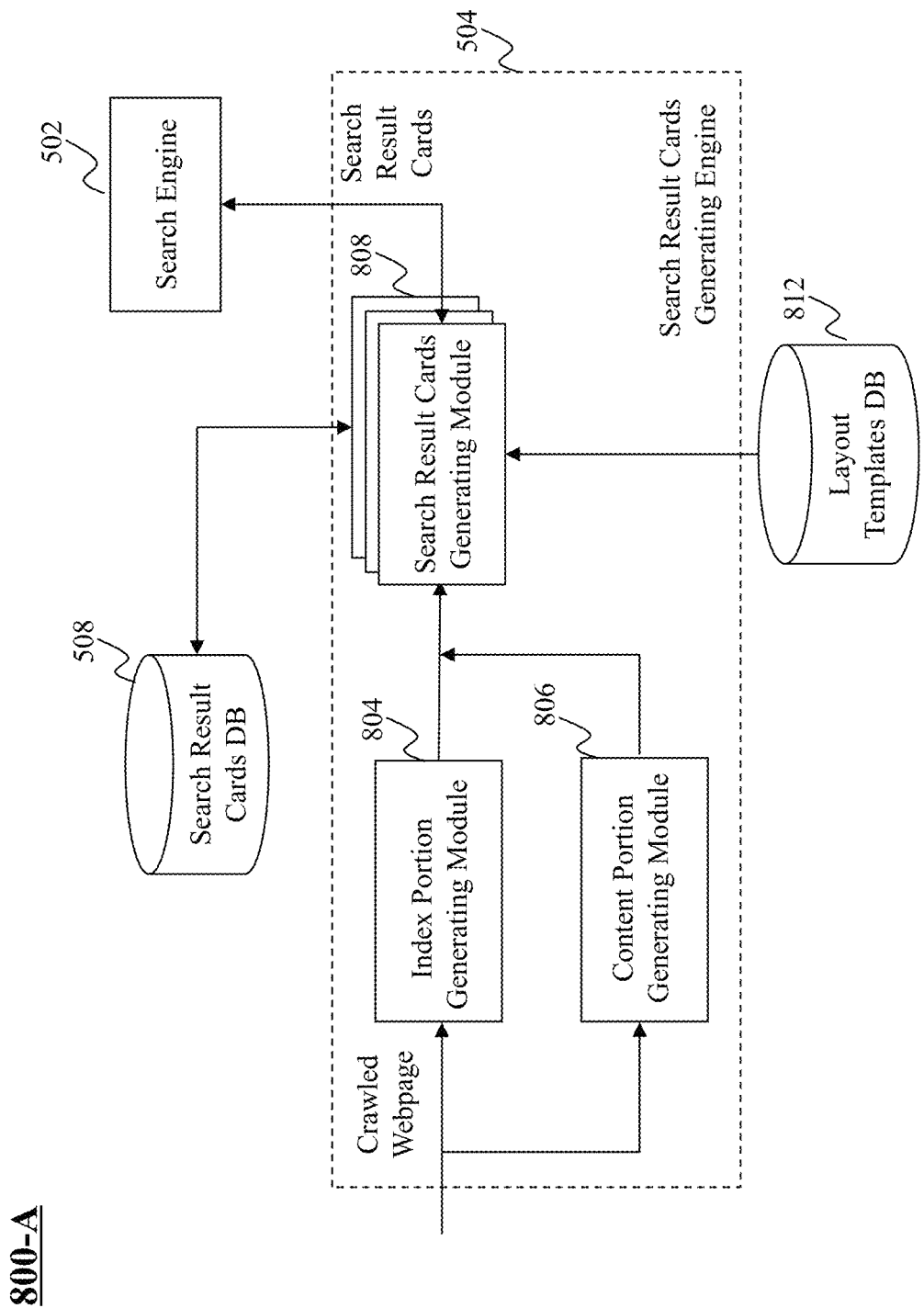
FIG. 8A is an exemplary system diagram of a search result cards generating engine in the system of FIG. 5, according to an embodiment of the present teaching.

FIG. 8A is an exemplary system diagram of a search result cards generating engine in the system of FIG. 5, according to an embodiment shown in FIG. 7A. The search result cards generating engine 504 in this embodiment includes an index portion generating module 804, a content portion generating module 806, and a search result cards generating module 808. The search result card according to this embodiment is pre-generated and stored in the search result cards database 508. The pre-generation of the search result card may be performed by a scheduled webpage crawling. Information from a crawled webpage is provided to the index portion generating module 804 and the content portion generating module 806. According to this embodiment, a search result card may comprise an index portion and a content portion; however, the search result card may comprise other elements or categories. The generated index portion and content portion are further provided to the search result cards generating module 808, which is configured to apply one of the search result cards layout template from the layout templates database 812 and generate the search result card for a given search result. The offline pre-generated search result card is further stored in the search result cards database 508. In the future, upon receiving a search result fetched by the search engine 502, the search result cards generating engine 504 may directly retrieve the corresponding search result card and return it to the user.

Figure 8B:
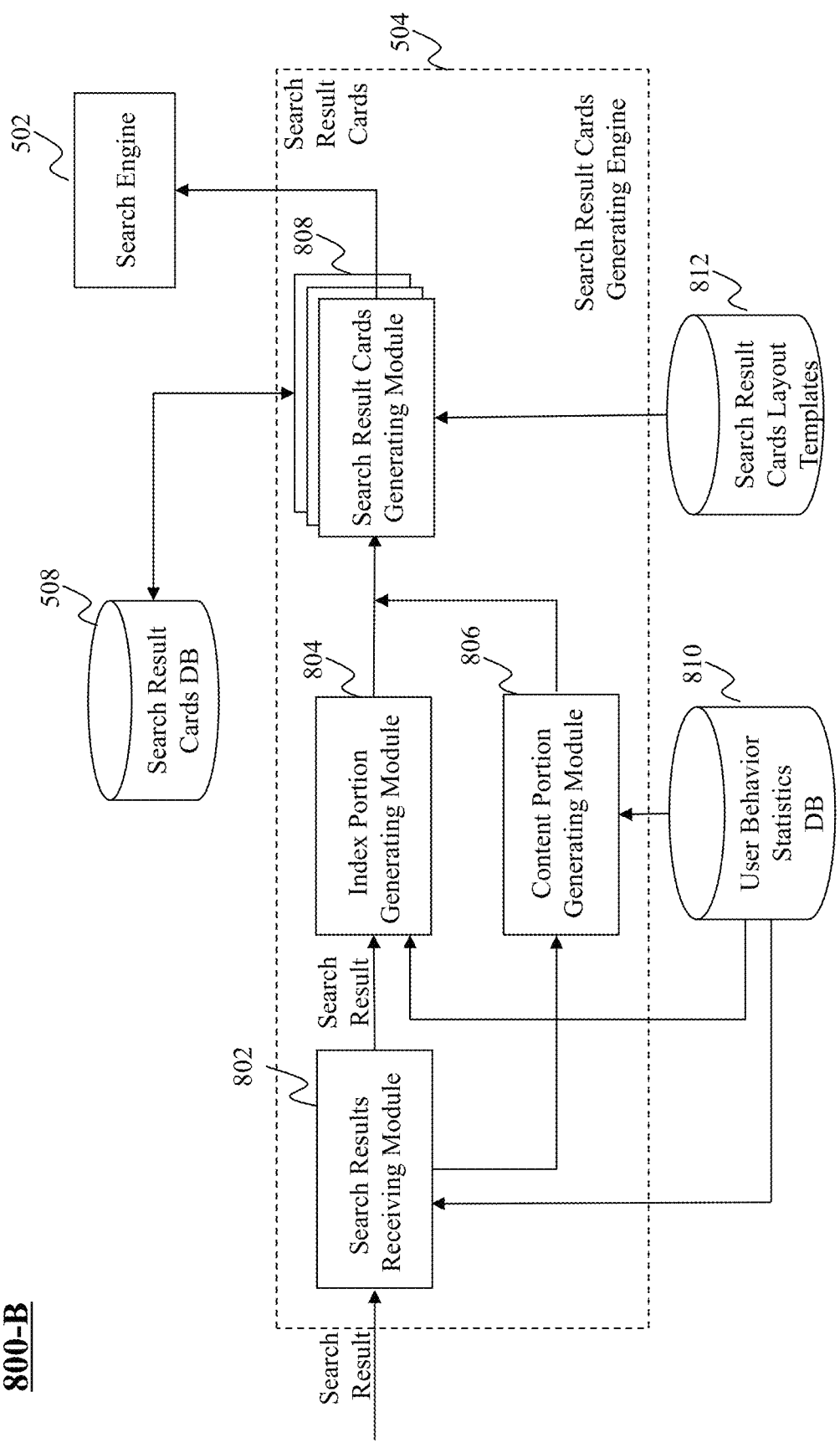
FIG. 8B is an exemplary system diagram of a search result cards generating engine in the system of FIG. 5, according to another embodiment of the present teaching.

FIG. 8B is an exemplary system diagram of a search result cards engine in the system of FIG. 5, according to another embodiment shown in FIG. 7B. The search result cards generating engine 504 in this embodiment includes a search results receiving module 802, an index portion generating module 804, a content portion generating module 806, and a search result cards generating module 808. The search result card according to this embodiment is generated in real-time upon receiving a search query from the user. The search results receiving module 802 provide the search results to the index portion generating module 804 and the content portion generating module 806, which are configured to generate the index portion and the content portion of a search result card based on the user behavior. The index portion generating module 804 and the content portion generating module 806 may retrieve user behavior history data from the user behavior statistics database 810, and determine the priorities of presenting information from the search result. The refined index portion and the content portion are further provided to the search result cards generating module 808, which is configured to generate the search result card using a selected layout.

Figure 9A:
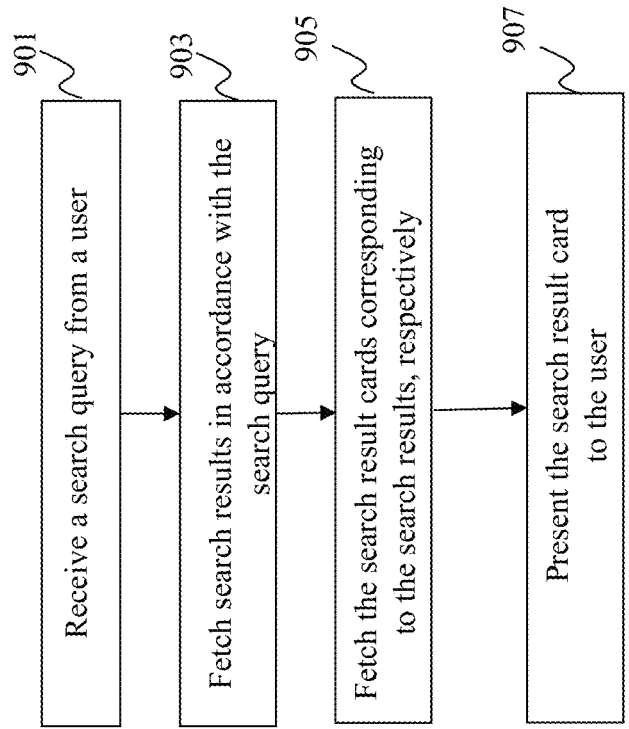
FIG. 9A is a flowchart of an exemplary process for presenting a search result in a search result card, according to an embodiment shown in FIG. 8A.

FIG. 9A is a flowchart of an exemplary process for presenting a search result in a search result card, according to an embodiment shown in FIG. 8A. At step 901, a search query is received from a user. At step 903, the search result in accordance with the search query is fetched from the search index. At step 905, a search result card corresponding to the search result is fetched from the search result card database. At step 907, the search result card is presented to the user.

Figure 9B:
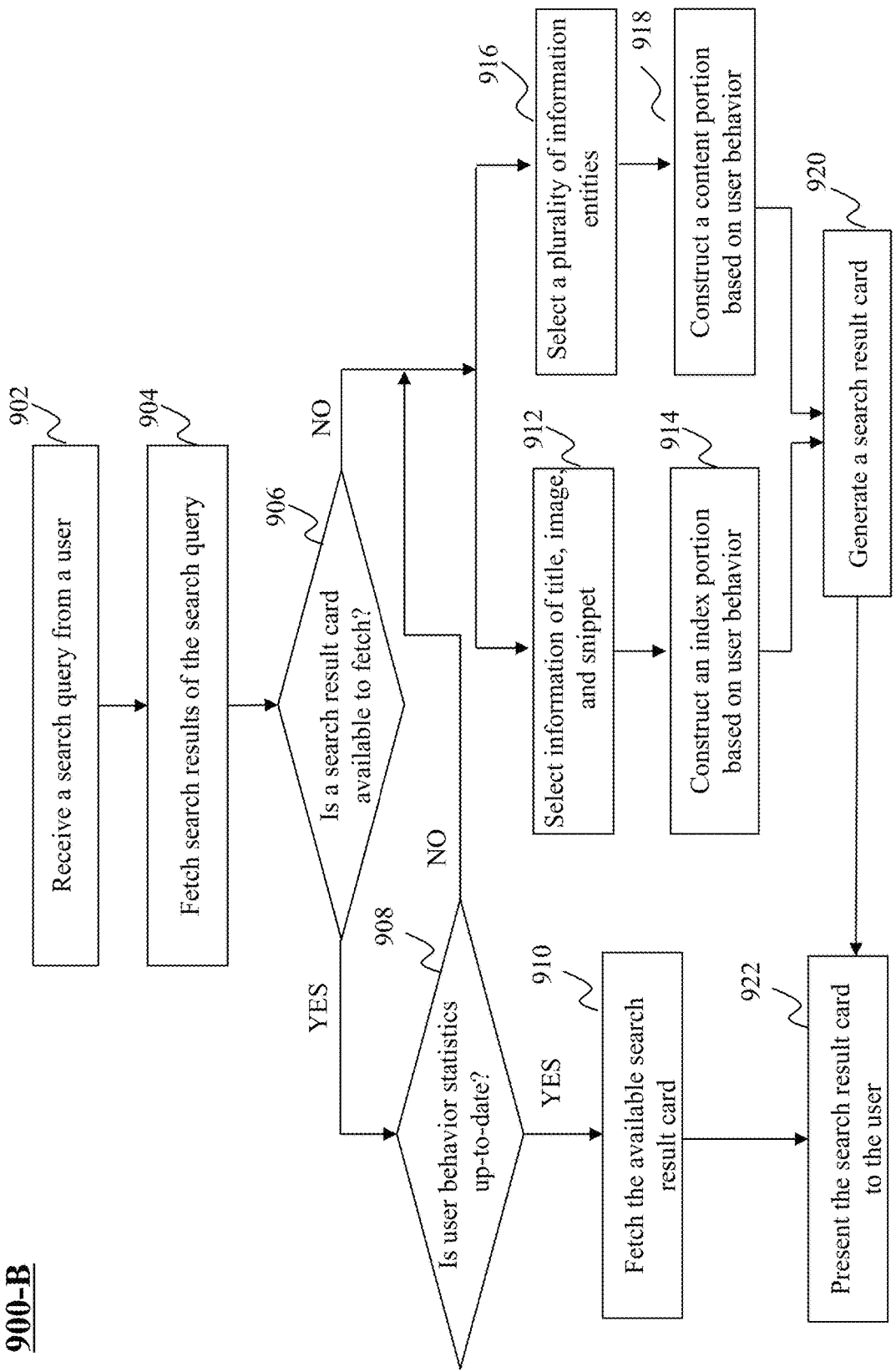
FIG. 9B is a flowchart of an exemplary process for presenting a search result in a search result card, according to another embodiment shown in FIG. 8B.

FIG. 9B is a flowchart of an exemplary process for presenting a search result in a search result card, according to an embodiment shown in FIG. 8B. At step 902, a search query is received from a user. At step 904, the search results in accordance with the search query is fetched from the search index. At step 906, a decision is made as to whether a corresponding search result card is available to fetch. If it is determined that the search result card is available to fetch, at step 908, a second decision is made as to whether user behavior statistics is up-to-date. If it is determined that the user behavior statistics is up-to-date, at step 910, the available search result card is fetched from the search result cards database. At step 922, the fetched search result card is presented to the user. On the other hand, if it is determined that the search result card is not available to fetch, or the user behavior statistics is not up-to-date, at step 912, the information of title, image and snippet are selected from the search result and an index portion is constructed based on the user behavior at step 914; and at step 916, a plurality of information entities are selected from the search result and a content portion is constructed based on the user behavior at step 918. Further, at step 920, a search result card is generated using the constructed index portion and content portion.

Figure 10A:
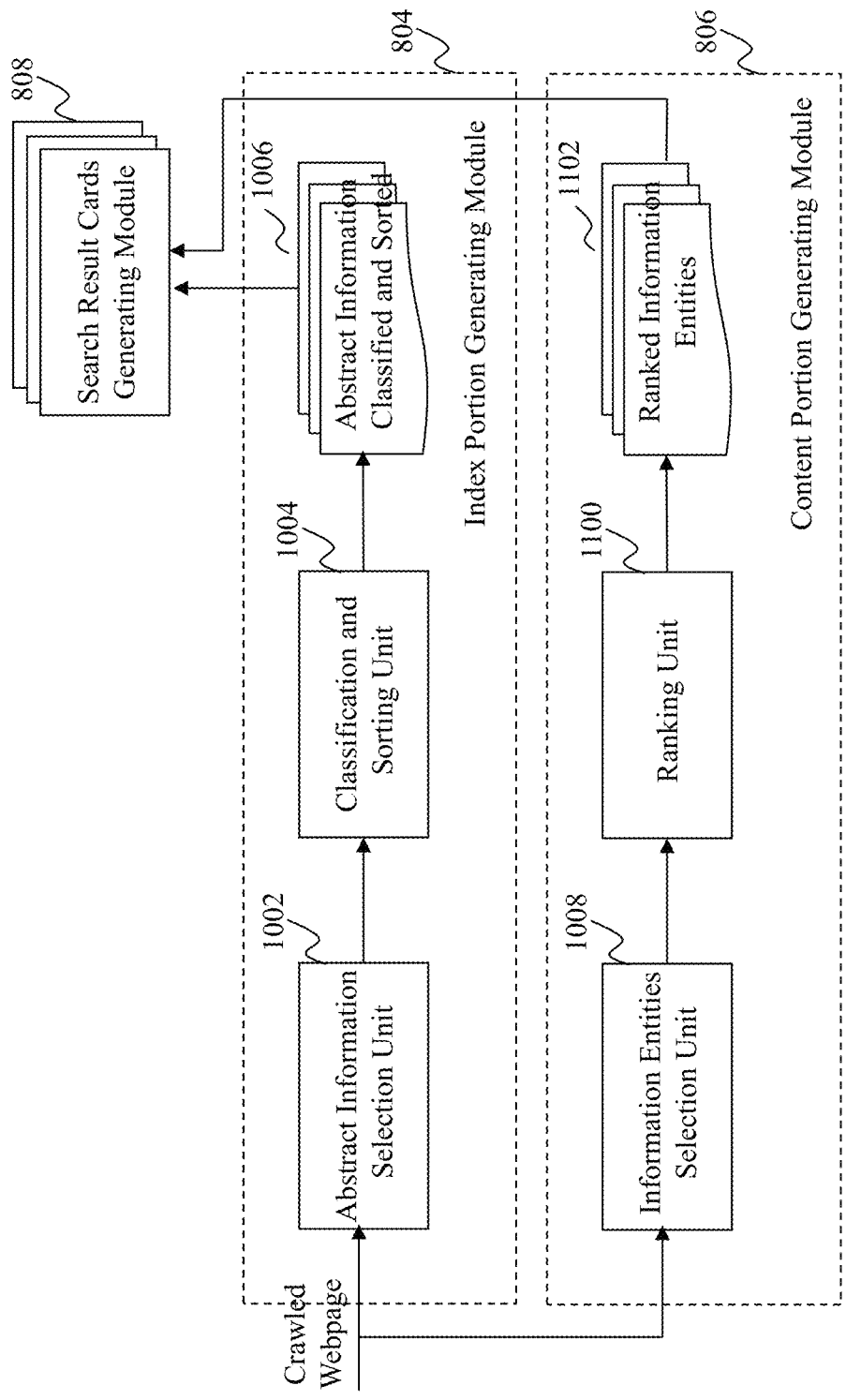
FIG. 10A is an exemplary system diagram of an index portion generating module and a content portion generating module of the search result cards generating engines, according to an embodiment shown in FIG. 8A.

FIG. 10A is an exemplary system diagram of an index portion generating module and a content portion generating module in the search result cards generating engines, according to an embodiment shown in FIG. 8A. The index portion generating module 804 in this embodiment includes an abstract information selection unit 1002, a classification and sorting unit 1004, and a cache 1006 for storing the classified and sorted abstract information. The content portion generating module 806 in this embodiment includes an information entities selection unit 1008, a ranking unit 1100, and a cache 1102 for storing the ranked information entities. The information from a crawled webpage is provided to the abstract information selection unit 1002 and the information entities selection unit 1008. Information such as title of the webpage, brief descriptions of the webpage, logo and/or images representing the webpages may be selected as the abstract information. Classification and sorting of the abstract information may be performed using the predefined criteria including but not limited to types of the information (e.g., textual information, image information, etc.), category that the webpage belongs to (e.g., travel, dining, financial etc.), recent updates etc. Information entities may be selected from contents extracted from each layer of the webpages based on the category of the webpage. For example, information on a menu page may be selected if the webpage is for a restaurant, while information of seller/buyer agents and loan interest may be selected if the webpage is for house listing. Ranking of the information entities may be based on one or more parameters, such as, relevance of the entity to the homepage category, popularity of the entity among user clicks, etc. In some embodiments, the classification and sorting of the abstract information and the ranking of the information entities may use historical data associated with the webpage visiting. Therefore, on the circumstance that the real-time user behavior data is not available, the search result cards generating module 808 can still construct a search result card that fits most users' browsing behavior and interests for future search.

Figure 10B:
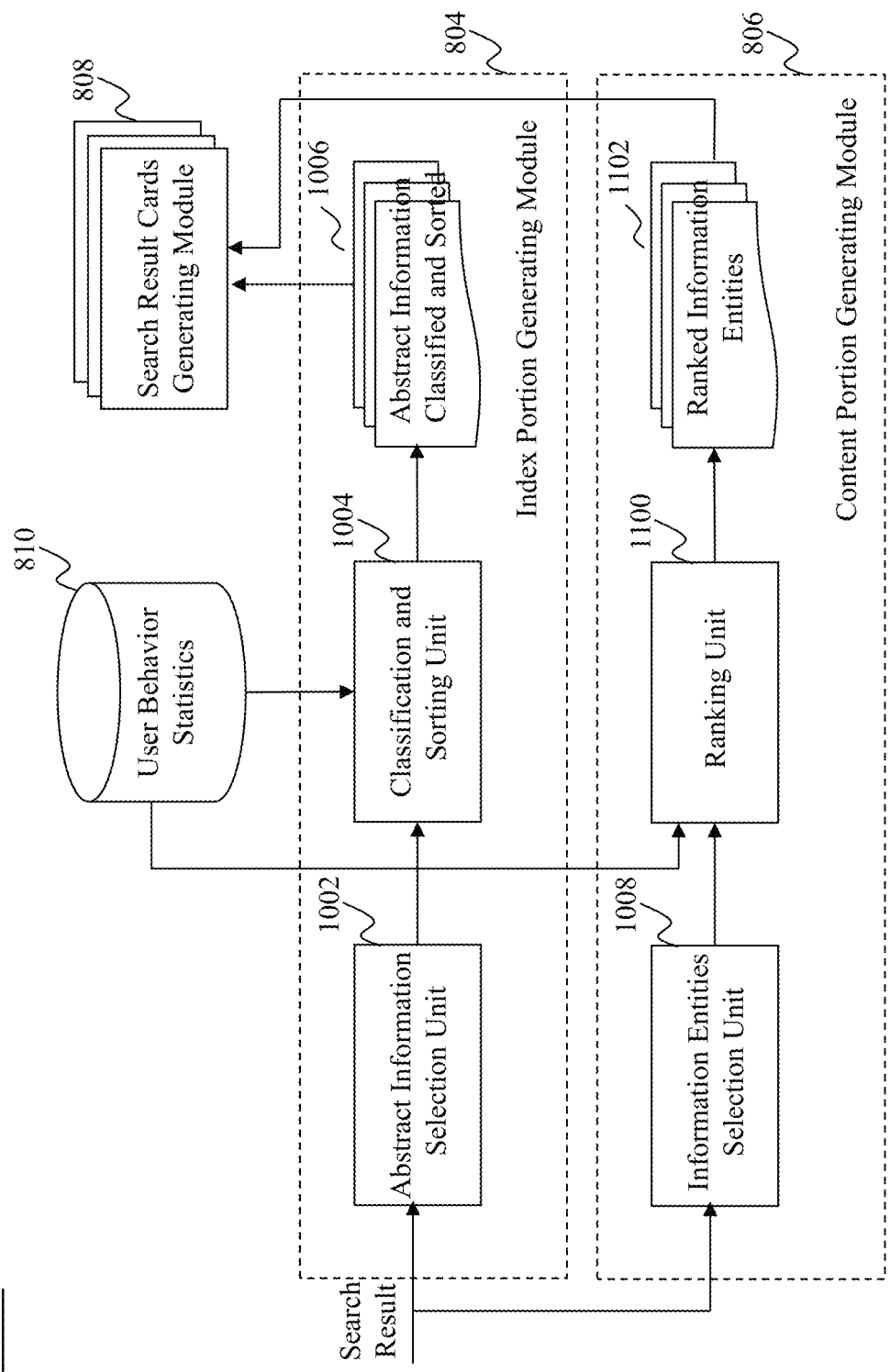
FIG. 10B is an exemplary system diagram of an index portion generating module and a content portion generating module of the search result cards generating engines, according to an embodiment shown in FIG. 8B.

FIG. 10B is an exemplary system diagram of an index portion generating module and a content portion generating module in the search result cards generating engines, according to an embodiment shown in FIG. 8B. According to this embodiment, the search result card is generated in real-time incorporating the user data. The history data of the user who submits the search query is retrieved from the user behavior statistics database 810, and provided to the classification and sorting unit 1004 and the ranking unit 1100 to further refine the selected information from the search result. By incorporating the real-time user data into the search result card, the search result card has personalized characters that best match the particular user's browsing behavior and search interest.

Figure 11:
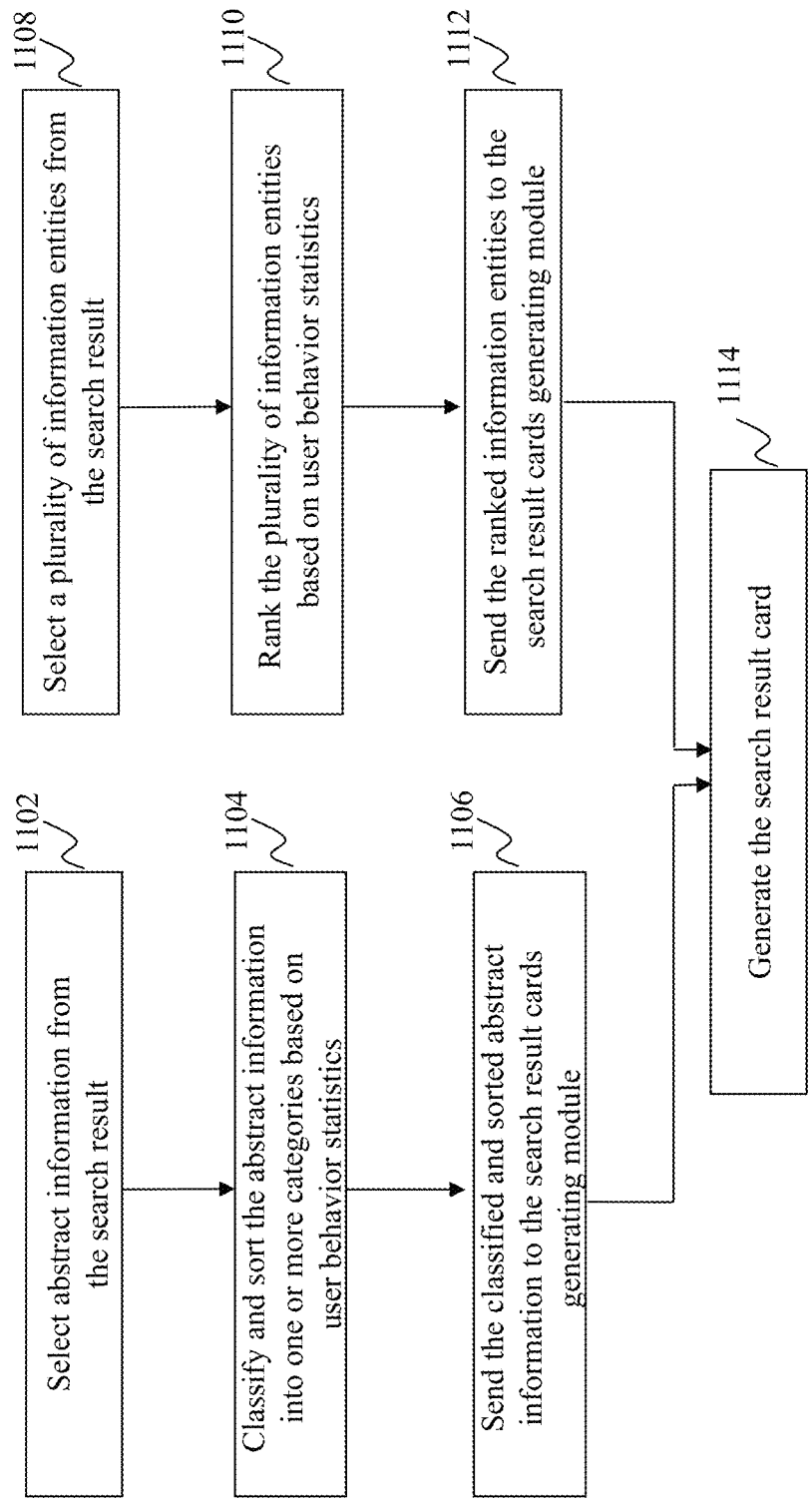
FIG. 11 is a flowchart of an exemplary process for generating the search result cards, according to an embodiment of the present teaching.

FIG. 11 is a flowchart of an exemplary process for generating the search result cards, according to an embodiment of the present teaching. The process for generating the search result cards in this embodiment includes selecting abstract information from the search result (step 1102), classifying and sorting the abstract information into one or more categories based on user behavior statistics (step 1104), sending the classified and sorted abstract information to the search result cards generating module (step 1106), selecting a plurality of information entities from the search result (step 1108), ranking the plurality of information entities based on user behavior statistics (step 1110), sending the ranked information entities to the search result cards generating module (step 1112), and generating the search result cards (step 1114).

Figure 12:
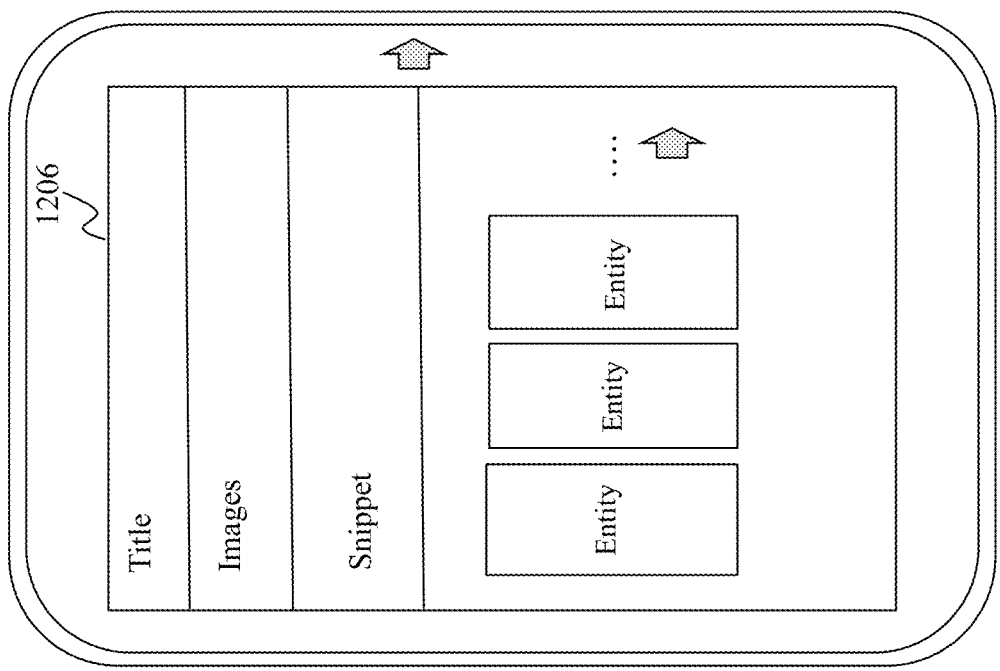
FIG. 12 is exemplary search result cards presented to the user, according to an embodiment of the present teaching.
Figure 12:
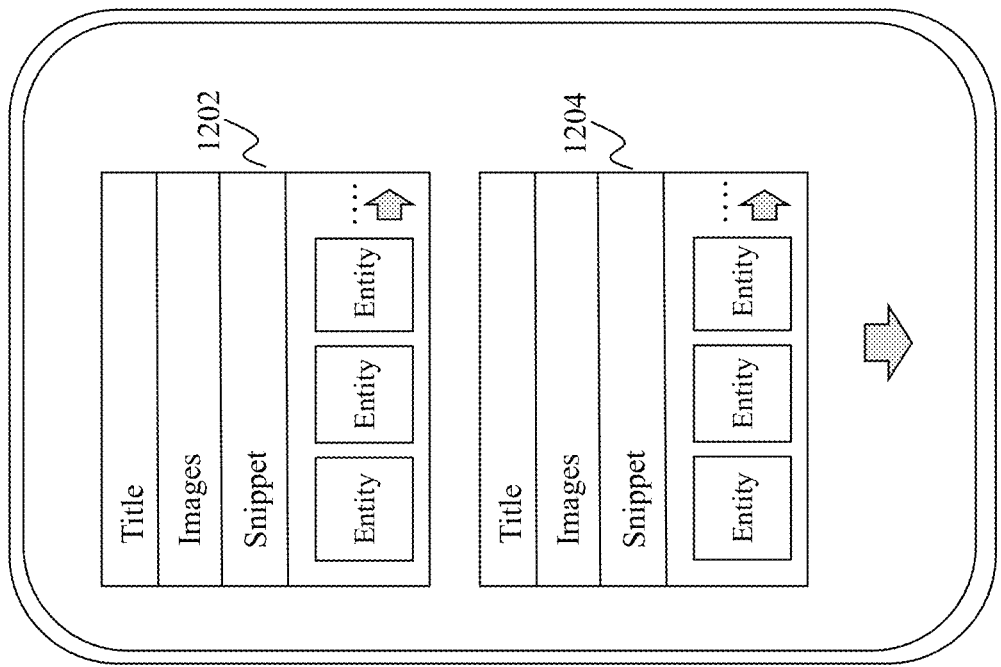

FIG. 12 is exemplary search result cards presented to the user, according to an embodiment of the present teaching. In FIG. 12(*a*), two search result cards 1202 and 1204 are presented at one time on a user device screen shown in FIG. 12(*a*); while in FIG. 12(*b*), multiple search result cards are presented in a tabbed interface, and only one single search result card 1206 is displayed at one time on the user device screen. The numbers of the search result cards displayed on the user device screen are not limited to the illustrated examples, but may be any numbers based on user configuration for better viewing experience. In some embodiment, the display of the search result cards may be slidable in a horizontal or vertical direction. For example, sliding up the search result cards 1202 and 1204 in FIG. 12(*a*) may replace search result card 1202 with search result card 1204, and present a new search result card beneath the search result card 1204; while sliding the search result card 1206 in FIG. 12(*b*) to the left may replace the search result card 1206 with a new search result card. Further, instead of squeezing all selected information related to a search result into a display area of the search result card, a predefined amount of information are shown in the initial view of the search result card. Yet, each item of the search result card may be configured to be slidable to facilitate viewing more information. As a result, the user can view more information associated with the search result without losing the convenience and comfort of browsing the information.

Figure 13:
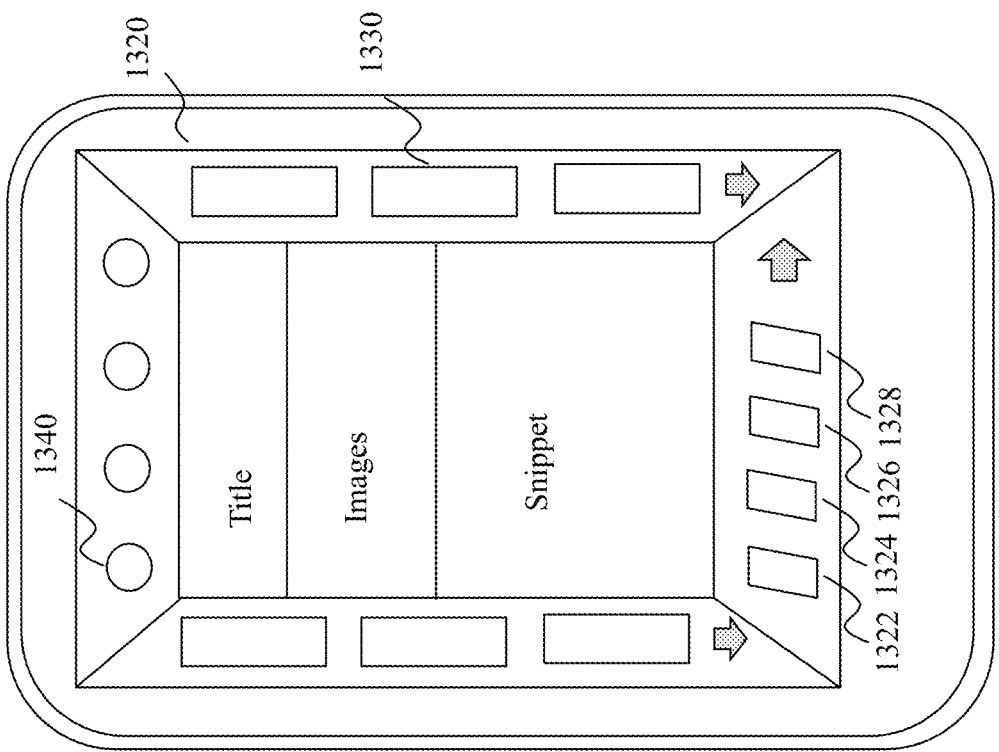
FIG. 13 is exemplary search result cards presented to the user, according to another embodiment of the present teaching.
Figure 13:
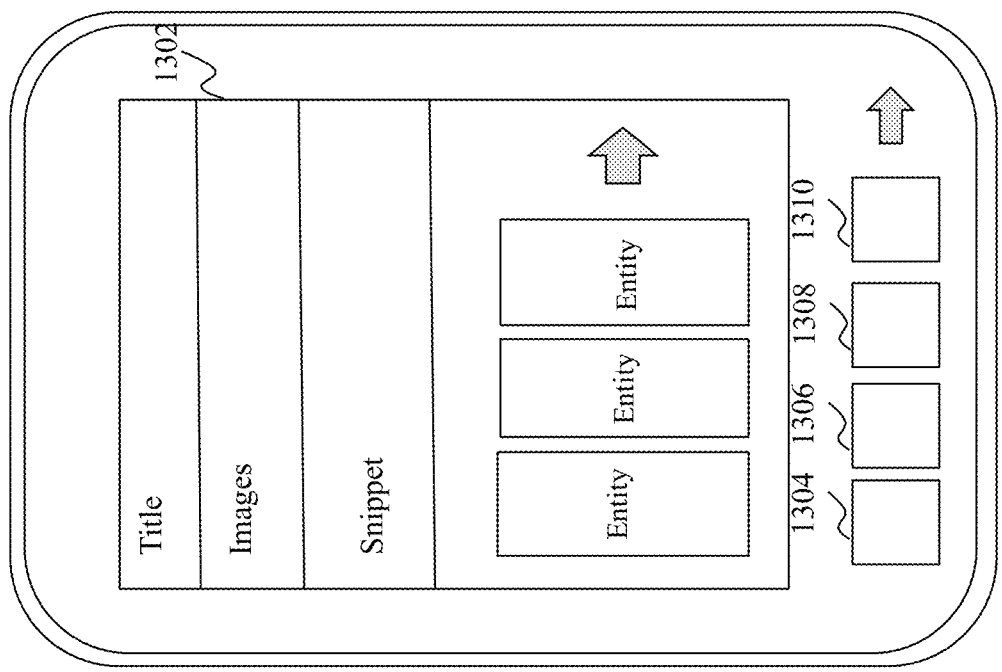

FIG. 13 is exemplary search result cards presented to the user, according to another embodiment of the present teaching. In the embodiment shown in FIG. 13(*a*), one search result card 1302 are displayed in full size and other search result cards 1304, 1306, 1308 and 1310 are shown as thumbnails and displayed beneath the search result card 1302. More search result card thumbnails may be displayed by sliding the bottom screen. The user may touch a search result card thumbnail, i.e., one of the search result cards 1304, 1306, 1308 and 1310, to display the selected search result card in full size. Meantime, the originally displayed search result card 1302 may be pulled back to the bottom of the screen, and displayed as a thumbnail. In the embodiment shown in FIG. 13(*b*), the multiple search result cards are displayed in a 3-D view, where the title, logo/images, and snippet of the search result card 1320 are displayed in the center of the 3-D view, the plurality of information entities 1330 are displayed on the side walls of the 3-D view, and other search result cards 1322, 1324, 1326 and 1328 are displayed on the bottom portion of the 3-D view. When the user touches one of the search result card thumbnails displayed on the bottom portion of the 3-D view, the title, logo/images, and snippet of the selected search result card will be displayed on the center of the 3-D view, and the side walls of the 3-D view will be updated according to the newly selected search result card. Meantime, the previously centered search result card 1320 will be pulled back to the bottom portion, and displayed as a thumbnail. The 3-D view may also include one or more user interaction gadgets 1340 on the upper portion of the 3-D view, such as "call," "direction to here," "homepage," etc.

Figure 14:
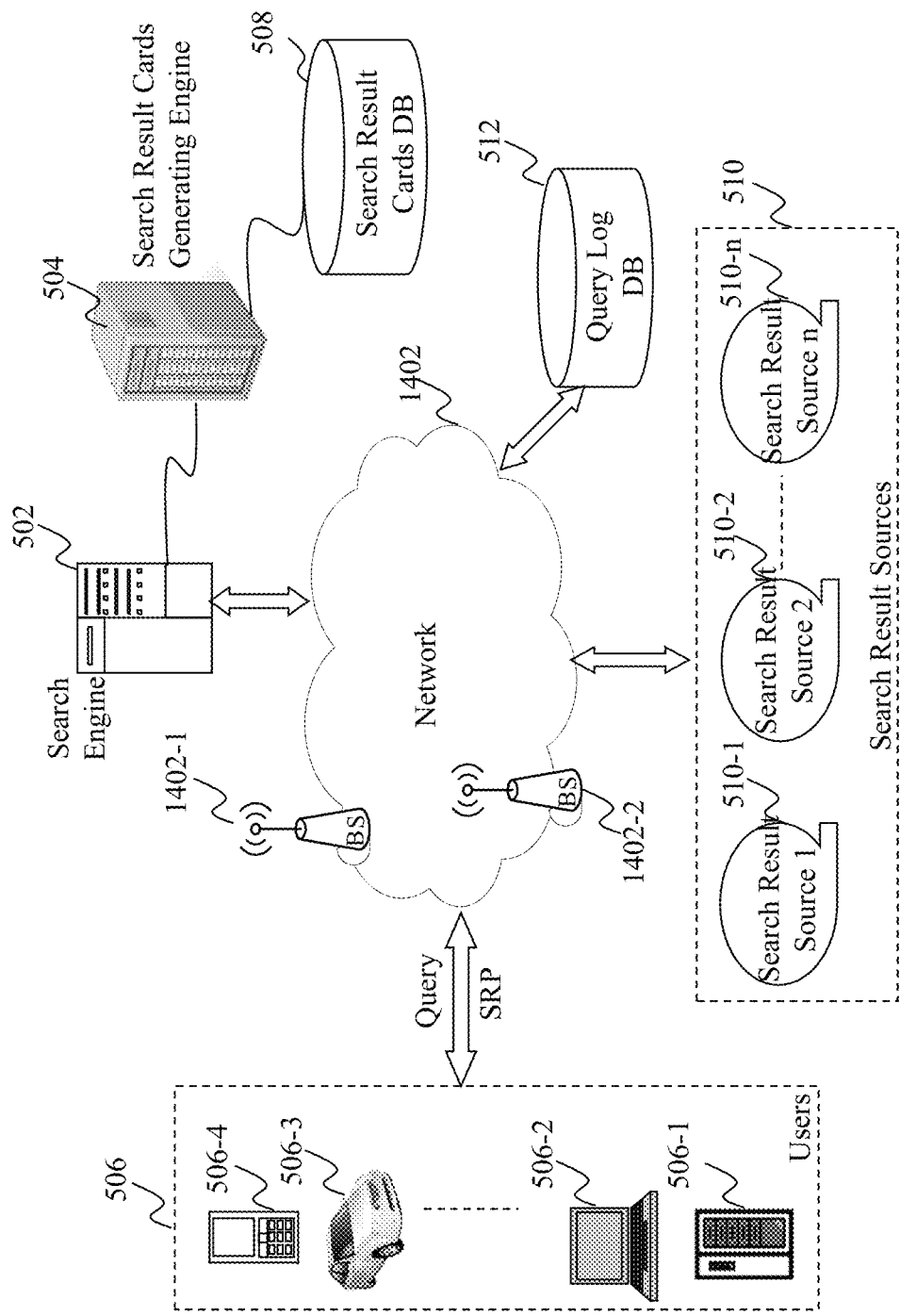
FIG. 14 is a high level exemplary networked environment in which search result cards presentation is applied, according to an embodiment of the present teaching.

FIG. 14 is a high level exemplary networked environment in which search result cards presentation is applied, according to an embodiment of the present teaching. In FIG. 14, the exemplary networked environment 1400 includes the search engine 502, the search result cards generating engine 504, the users 506, the search result sources 510, the query log database 512, the search result cards database 508, and a network 1402. The network 1402 may be a single network or a combination of different networks. For example, the network 1402 may be a local area network (LAN), a wide area network (WAN), a public network, a private network, a proprietary network, a Public Telephone Switched Network (PSTN), the Internet, a wireless network, a virtual network, or any combination thereof. The network 1402 may also include various network access points, e.g., wired or wireless access points such as base stations or Internet exchange points 1402-1, . . . , 1402-2, through which a data source may connect to the network 1402 in order to transmit information via the network 1402.

The users 506 may be of different types such as users connected to the network 1402 via desktop computers 506-1, laptop computers 506-2, a built-in device in a motor vehicle 506-3, or a mobile device 506-4. A user 506 may send a search query to the search engine 502 via the network 1402 and receive a search result presented in a search result card from the search engine 502. In some embodiment, the search result cards are generated by the search result cards generating engine 504 in real-time; while in another embodiment, the search result cards are generated offline by crawling the webpages, and stored in the search result cards database 508 in advance. In this embodiment, as described in detail above, the search result cards generating engine 504 and the search result cards database 508 serve as a backend system for providing search result cards representing the search results. In addition, in some embodiments, the search engine 502 may access query log, via the network 1402, stored in the query log database 512 to determine trending/popular queries or query suggestions to be provided to the users 506. The information in the query log database 512 may be generated by one or more different applications (not shown), which may be running on the search engine 502, at the backend of the search engine 502, or as a completely standalone system capable of connecting to the network 1402, accessing information from different sources, analyzing the information, generating structured information, and storing such generated information in the query log database 512.

The search result sources 510 include multiple search result sources 510-1, 510-2, . . . , 510-3, such as vertical search result sources (e.g., shopping, local, news, finance, etc.). A search result source may correspond to a website hosted by an entity, whether an individual, a business, or an organization such as USPTO.gov, a content provider such as cnn.com and Yahoo.com, a social network website such as Facebook.com, or a content feed source such as tweeter or blogs. The search engine 502 and the search result cards generating engine 504 may retrieve information from any of the search result sources 510-1, 510-2, . . . , 510-3. For example, the search engine 502 crawls the search result sources 510-1, 510-2, . . . , 510-3 for building its search index; and the search result cards generating engine 504 fetches search result sources 510-1, 510-2, . . . , 510-3 for constructing the search result cards in real-time.

Figure 15:
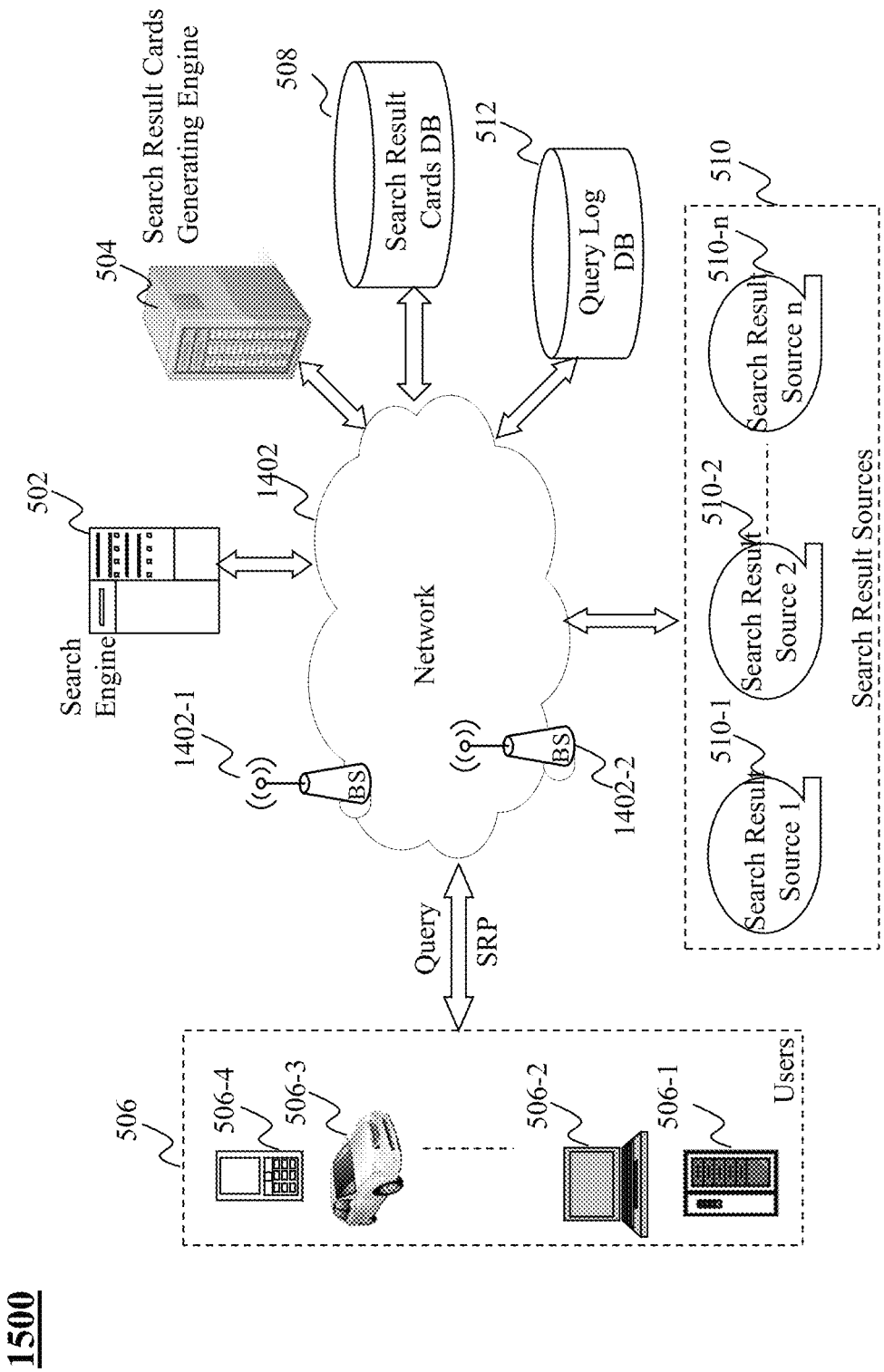
FIG. 15 is another high level exemplary networked environment in which search result cards presentation is applied, according to an embodiment of the present teaching.

FIG. 15 is another high level exemplary networked environment in which search result cards presentation is applied, according to an embodiment of the present teaching. The networked environment 1500 in this embodiment is similar to the networked environment 1400 in FIG. 14, except that the search result cards generating engine 504 and the search result cards database 508 in this embodiment act as an independent service providers that directly connect to the network 1402. For example, an independent service provider with the search result cards generating engine 504 may serve multiple search engines via the network 1402.

Figure 16:
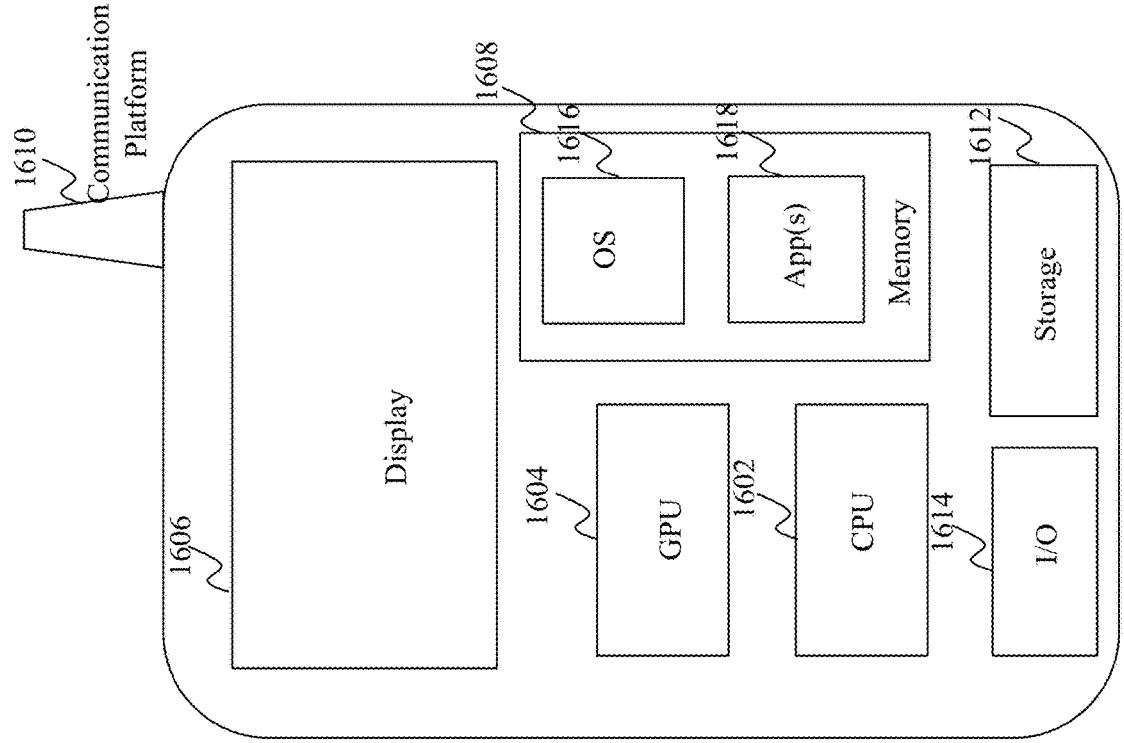
FIG. 16 depicts a general mobile device architecture on which the present teaching can be implemented.

FIG. 16 depicts a general mobile device architecture on which the present teaching can be implemented. In this example, the user device is a mobile device 1600, including but is not limited to, a smart phone, a tablet, a music player, a handled gaming console, a global positioning system (GPS) receiver, a smart-TV, wearable devices, etc. The mobile device 1600 in this example includes one or more central processing units (CPUs) 1602, one or more graphic processing units (GPUs) 1604, a display 1606, a memory 1608, a communication platform 1610, such as a wireless communication module, storage 1612, and one or more input/output (I/O) devices 1614. Any other suitable component, such as but not limited to a system bus or a controller (not shown), may also be included in the mobile device 1600. As shown in FIG. 16, a mobile operating system 1616, e.g., iOS, Android, Windows Phone, etc., and one or more applications 1618 may be loaded into the memory 1608 from the storage 1612 in order to be executed by the CPU 1602. The applications 1618 may include a browser or any other suitable mobile apps for sending the search query and rendering the search results page through the mobile device 1600. Execution of the applications 1618 may cause the mobile device 1600 to perform the processing as described above in the present teaching. For example, presentation of a search results page to the user may be made by the GPU 1604 in conjunction with the display 1606. A search query may be inputted by the user via the I/O devices 1614 and transmitted to the search engine 502 via the communication platform 1610.

To implement the present teaching, computer hardware platforms may be used as the hardware platform(s) for one or more of the elements described herein. The hardware elements, operating systems, and programming languages of such computers are conventional in nature, and it is presumed that those skilled in the art are adequately familiar therewith to adapt those technologies to implement the processing essentially as described herein. A computer with user interface elements may be used to implement a personal computer (PC) or other type of work station or terminal device, although a computer may also act as a server if appropriately programmed. It is believed that those skilled in the art are familiar with the structure, programming, and general operation of such computer equipment and as a result the drawings should be self-explanatory.

Figure 17:
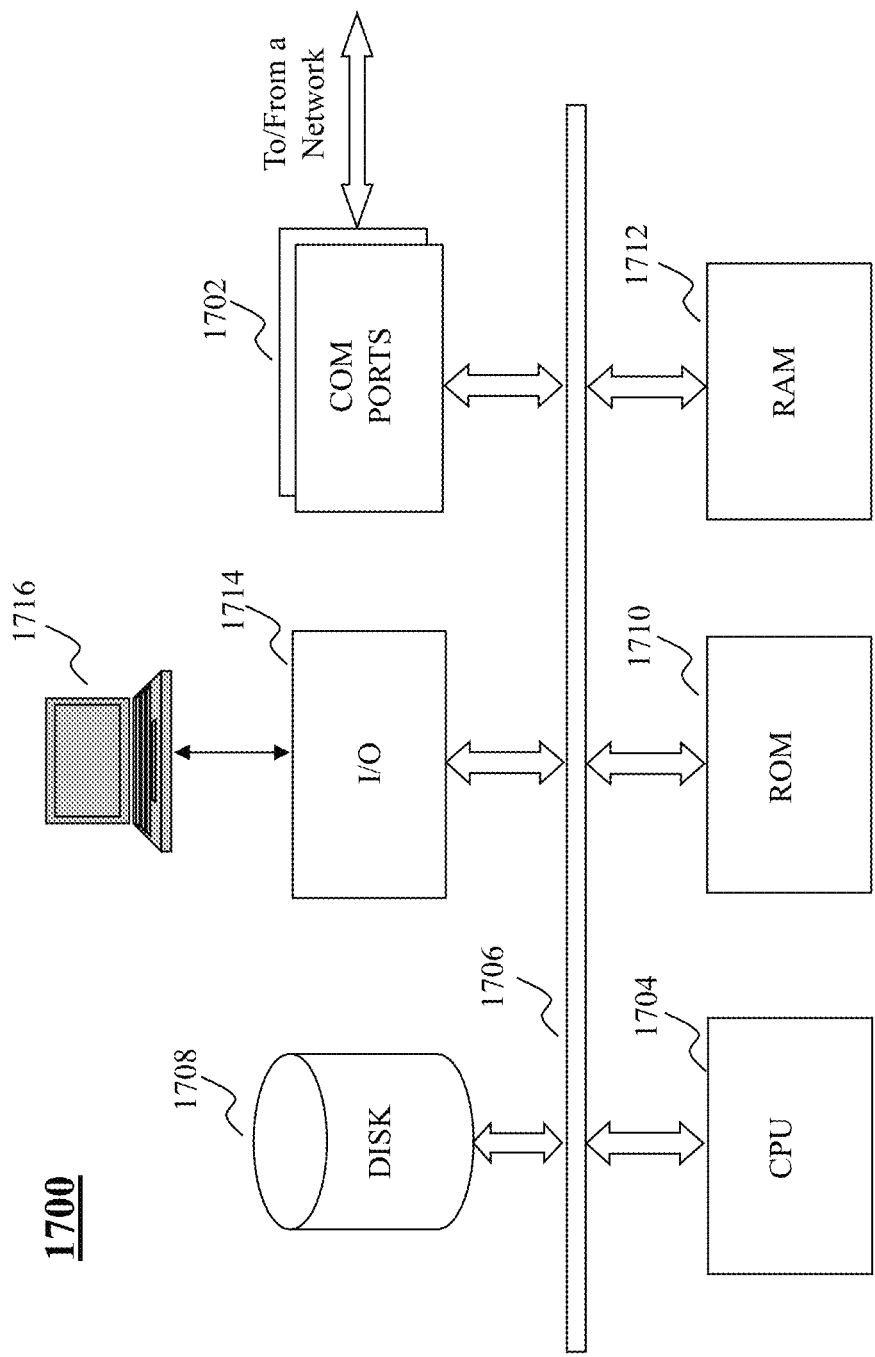
FIG. 17 depicts a general computer architecture on which the present teaching can be implemented.

FIG. 17 depicts a general computer architecture on which the present teaching can be implemented and has a functional block diagram illustration of a computer hardware platform that includes user interface elements. The computer may be a general-purpose computer or a special purpose computer. This computer 1700 can be used to implement any components of the online search architecture as described herein. Different components of the systems disclosed in the present teaching can all be implemented on one or more computers such as computer 1700, via its hardware, software program, firmware, or a combination thereof. Although only one such computer is shown, for convenience, the computer functions relating to online search may be implemented in a distributed fashion on a number of similar platforms, to distribute the processing load.

The computer 1700, for example, includes COM ports 1702 connected to and from a network connected thereto to facilitate data communications. The computer 1700 also includes a CPU 1704, in the form of one or more processors, for executing program instructions. The exemplary computer platform includes an internal communication bus 1706, program storage and data storage of different forms, e.g., disk 1708, read only memory (ROM) 1710, or random access memory (RAM) 1712, for various data files to be processed and/or communicated by the computer, as well as possibly program instructions to be executed by the CPU 1704. The computer 1700 also includes an I/O component 1714, supporting input/output flows between the computer and other components therein such as user interface elements 1716. The computer 1700 may also receive programming and data via network communications.

Hence, aspects of the methods of presenting content summary of search results, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it can also be implemented as a software only solution—e.g., an installation on an existing server. In addition, the units of the host and the client nodes as disclosed herein can be implemented as a firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

I claim:

1. A method, implemented on at least one computing device each of which has at least one processor, storage, and a communication platform connected to a network for generating search result cards, the method comprising:
    obtaining search results based on a search query from a user;
    classifying and sorting content associated with each of the search results into categories;
    extracting, from the content, multiple information entities based on the categories;
    reorganizing, based on the user's past behavior indicating that the user prefers one of the information entities to another one of the information entities, the extracted information entities into an order in which the one information entity is placed before the another one information entity;
    generating a search result card in which the reorganized information entities are displayed in the order; and
    providing the search result card as a response to the search query to the user.

2. The method of claim 1, further comprising:
    searching a search result cards database in response to receiving each of the search results; and
    determining whether a corresponding search result card has been generated previously for each of the search results, wherein the search result card is generated in response to determining that the corresponding search result card has not been generated previously.

3. The method of claim 1, wherein generating the search result card comprise:
    generating an index portion and a content portion for the search result card based on the user's past behavior;
    determining priorities for presenting information from each of the search results; and
    refining the index portion and the content portion for each of the search result card based on the priorities.

4. The method of claim 1, further comprising:
    generating a ranking of the information entities based on the user's past behavior, wherein the order of the information entities is determined based on the ranking.

5. The method of claim 1, wherein providing the search result card comprises one of the following:
    providing the search result card to a user device to be displayed as a full size search result card on a user interface rendered by the user device; or
    providing the search result card as a thumbnail image, wherein responsive to the user selecting the thumbnail image, the search result card is displayed in full size.

6. The method of claim 1, wherein the search result card is generated in real-time based on the user's past behavior.

7. The method of claim 1, wherein the information entities comprise audio or video extracted from the content.

8. The method of claim 1, wherein the search result card is displayed as a 3-D object such that as a user interacts with the 3-D object, additional information associated with the search result card is presented.

9. One or more non-transitory computer-readable media storing computer program instructions that, when executed by one or more processors, effectuate operations comprising:
    obtaining search results based on a search query from a user;
    classifying and sorting content associated with each of the search results into categories;
    extracting, from the content, multiple information entities based on the categories;
    reorganizing, based on the user's past behavior indicating that the user prefers one of the information entities to another one of the information entities, the extracted information entities into an order in which the one information entity is placed before the another one information entity;
    generating a search result card in which the reorganized information entities are displayed in the order; and
    providing the search result card as a response to the search query to the user.

10. The one or more non-transitory computer-readable media of claim 9, wherein the operations further comprise:
    searching a search result cards database in response to receiving each of the search results; and
    determining whether a corresponding search result card has been generated previously for each of the search results, wherein the search result card is generated in response to determining that the corresponding search result card has not been generated previously.

11. The one or more non-transitory computer-readable media of claim 9, wherein generating the search result card comprise:
    generating an index portion and a content portion for the search result card based on the user's past behavior;
    determining priorities for presenting information from each of the search results; and refining the index portion and the content portion for the search result card based on the priorities.

12. The one or more non-transitory computer-readable media of claim 9, wherein the operations further comprise: generating a ranking of the information entities based on the user's past behavior, wherein the order of the information entities is selected based on the ranking.

13. The one or more non-transitory computer-readable media of claim 9, wherein providing the search result card comprises one of the following:
providing the search result card to a user device to be displayed as a full size search result card on a user interface rendered by the user device; or
providing the search result card as a thumbnail image, wherein responsive to the user selecting the thumbnail image, the search result card is displayed in full size.

14. The one or more non-transitory computer-readable media of claim 9, wherein the search result card is generated in real-time based on the user's past behavior.

15. The one or more non-transitory computer-readable media of claim 9, wherein the one or more information entities comprise audio or video extracted from the content.

16. The one or more non-transitory computer-readable media of claim 9, wherein the search result card is displayed as a 3-D object such that as a user interacts with the 3-D object, additional information associated with the search result card is presented.

17. A system for generating search result cards, comprising:
memory storing computer program instructions; and
one or more processors that, when executing the computer program instructions, effectuate operations comprising:
obtaining search results based on a search query from a user;
classifying and sorting content associated with each of the search results into categories;
extracting, from the content, multiple information entities from the content based on the categories;
reorganizing, based on the user's past behavior indicating that the user prefers one of the information entities to another one of the information entities, the extracted information entities into an order in which the one information entity is placed before the another one information entity;
generating a search result card in which the reorganized information entities are displayed in the order; and
providing the search result card as a response to the search query to the user.

18. The system of claim 17, wherein the operations further comprise:
searching a search result cards database in response to receiving each of the search results; and
determining whether a corresponding search result card has been generated previously for each of the search results, wherein the search result card is generated in response to determining that the corresponding search result card has not been generated previously.

19. The system of claim 17, wherein generating the search result card comprise:
generating an index portion and a content portion for the search result card based on the user's past behavior;
determining priorities for presenting information from each of the search results; and
refining the index portion and the content portion for each of the search result card based on the priorities.

20. The system of claim 17, wherein providing the search result card comprises one of the following:
providing the search result card to a user device to be displayed as a full size search result card on a user interface rendered by the user device; or
providing the search result card as a thumbnail image, wherein responsive to the user selecting the thumbnail image, the search result card is displayed in full size.

* * * * *